US009622609B2

(12) United States Patent
Duncan et al.

(10) Patent No.: US 9,622,609 B2
(45) Date of Patent: *Apr. 18, 2017

(54) PATTERN CARPET TILES AND METHODS OF MAKING AND USING SAME

(75) Inventors: Reesie Duncan, Kennesaw, GA (US); Shannon Crump Cochran, Cartersville, GA (US)

(73) Assignee: Columbia Insurance Company, Omaha, NE (US)

(*) Notice: Subject to any disclaimer, the term of this patent is extended or adjusted under 35 U.S.C. 154(b) by 0 days.

This patent is subject to a terminal disclaimer.

(21) Appl. No.: 13/411,195

(22) Filed: Mar. 2, 2012

(65) Prior Publication Data

US 2013/0230681 A1    Sep. 5, 2013

(51) Int. Cl.
*A47G 27/00* (2006.01)
*A47G 27/02* (2006.01)
*A47G 27/04* (2006.01)

(52) U.S. Cl.
CPC ..... *A47G 27/0275* (2013.01); *A47G 27/0243* (2013.01); *A47G 27/0475* (2013.01); *B32B 2419/04* (2013.01); *Y10T 29/49778* (2015.01); *Y10T 29/49826* (2015.01); *Y10T 428/16* (2015.01); *Y10T 428/23936* (2015.04); *Y10T 428/23943* (2015.04); *Y10T 428/23986* (2015.04)

(58) Field of Classification Search
CPC .............. A47G 27/0275; A47G 27/025; A47G 27/0243; A47G 27/0475; A47G 27/0268; B32B 2419/04; E04F 15/02; Y10T 428/16; Y10T 428/163; Y10T 428/164; Y10T 428/23936

USPC ......................................... 428/88, 85, 47, 48
See application file for complete search history.

(56) References Cited

U.S. PATENT DOCUMENTS

| 1,453,728 A | 5/1923 | Fernand |
| 1,637,580 A | 8/1927 | Abel et al. |
| 2,715,289 A | 8/1955 | Gale |
| 3,067,701 A | 12/1962 | Wilcox |
| 3,216,469 A | 11/1965 | New |
| 3,241,509 A | 3/1966 | Short |

(Continued)

FOREIGN PATENT DOCUMENTS

| AU | 2013201200 | 3/2013 |
| BE | 1005677 | 12/1993 |

(Continued)

OTHER PUBLICATIONS

First Examination issued Dec. 1, 2014 by the Australian Patent Office for application 2013201200 filed Mar. 1, 2013 (Applicant—Shaw Industries Group, Inc. // Inventor—Duncan et al.) (5 pages).

(Continued)

*Primary Examiner* — Cheryl Juska
(74) *Attorney, Agent, or Firm* — Ballard Spahr LLP

(57) ABSTRACT

A carpet tile having a contrast pattern intermixed with a portion of a background pattern. The contrast pattern is positioned proximate a selected side edge of the carpet tile and has a contrast color different than the colors of the background pattern. Within a floor covering, the rotational position of the carpet tile can be varied to thereby achieve a desired visual appearance with respect to the contrast patterns of adjacent carpet tiles.

34 Claims, 24 Drawing Sheets

(56) References Cited

U.S. PATENT DOCUMENTS

| | | | | |
|---|---|---|---|---|
| 3,582,436 | A | | 6/1971 | Bucher .......... 156/502 |
| 3,741,786 | A | | 6/1973 | Torrey .......... 117/3.1 |
| 3,748,211 | A | | 7/1973 | Hoopengardner .......... 156/575 |
| 3,799,549 | A | | 3/1974 | Laker |
| 3,813,275 | A | | 5/1974 | Weick et al. .......... 156/527 |
| 3,839,127 | A | | 10/1974 | Hazuka et al. .......... 156/577 |
| 3,850,783 | A | * | 11/1974 | Peters et al. .......... 428/89 |
| 3,875,716 | A | * | 4/1975 | Eusemann .......... 52/311.2 |
| 3,969,181 | A | | 7/1976 | Seabold .......... 156/577 |
| 4,055,868 | A | * | 11/1977 | O'Neill, Jr. .......... 8/150 |
| 4,133,152 | A | | 1/1979 | Penrose |
| 4,148,678 | A | | 4/1979 | Fogle et al. .......... 156/527 |
| 4,151,039 | A | | 4/1979 | Lash .......... 156/527 |
| 4,242,389 | A | | 12/1980 | Howell .......... 428/40 |
| 4,336,097 | A | | 6/1982 | Kampen et al. .......... 156/527 |
| 4,370,937 | A | * | 2/1983 | Denny .......... 112/80.3 |
| 4,373,730 | A | | 2/1983 | Koltz |
| 4,546,025 | A | | 10/1985 | Vaisman |
| 4,557,774 | A | | 12/1985 | Hoopengardner .......... 156/71 |
| 4,581,091 | A | | 4/1986 | Lane .......... 156/304.4 |
| 4,613,396 | A | | 9/1986 | Scarborough .......... 156/391 |
| 4,681,481 | A | | 7/1987 | Kapusta |
| 4,797,170 | A | | 1/1989 | Hoopengardner .......... 156/71 |
| 4,880,490 | A | | 11/1989 | MacIntyre .......... 156/541 |
| 4,889,572 | A | | 12/1989 | Danico et al. |
| 5,002,425 | A | | 3/1991 | Ortiz Bordallo |
| 5,011,411 | A | * | 4/1991 | Loewy .......... 434/96 |
| D333,678 | S | | 3/1993 | Lissoni |
| 5,249,884 | A | | 10/1993 | Widmer |
| 5,290,390 | A | | 3/1994 | Roman et al. .......... 156/523 |
| 5,314,554 | A | | 5/1994 | Owens |
| 5,376,419 | A | | 12/1994 | Foster et al. .......... 428/40 |
| 5,403,414 | A | | 4/1995 | Corston .......... 156/71 |
| 5,456,792 | A | | 10/1995 | Rodriguez et al. .......... 156/577 |
| 5,482,182 | A | | 1/1996 | Thompson et al. .......... 221/73 |
| 5,582,675 | A | | 12/1996 | Stepanek .......... 156/308.2 |
| 5,693,395 | A | | 12/1997 | Wine |
| 5,863,632 | A | | 1/1999 | Bisker |
| D425,633 | S | | 5/2000 | Hunter |
| 6,159,329 | A | | 12/2000 | Tschanz et al. .......... 156/277 |
| 6,305,688 | B1 | | 10/2001 | Waroway |
| 6,790,042 | B2 | | 9/2004 | Worth |
| 6,802,164 | B1 | | 10/2004 | Newbrough et al. |
| 6,841,216 | B2 | * | 1/2005 | Daniel et al. .......... 428/48 |
| 6,908,656 | B2 | * | 6/2005 | Daniel et al. .......... 428/88 |
| 6,945,007 | B2 | * | 9/2005 | Kobayashi et al. .......... 52/749.11 |
| 7,021,304 | B1 | | 4/2006 | Houston |
| 7,070,846 | B2 | | 7/2006 | Beistline et al. |
| 7,083,841 | B2 | | 8/2006 | Oakey et al. |
| 7,114,542 | B2 | | 10/2006 | Pelligra .......... 156/526 |
| 7,116,843 | B1 | | 10/2006 | Wensley et al. |
| 7,198,086 | B2 | | 4/2007 | Dusich .......... 156/527 |
| 7,297,385 | B2 | * | 11/2007 | Daniel et al. .......... 428/48 |
| 7,305,647 | B1 | | 12/2007 | Pelham |
| 7,341,772 | B2 | | 3/2008 | Guess |
| 7,350,443 | B2 | * | 4/2008 | Oakey et al. .......... 83/13 |
| 7,669,631 | B2 | | 3/2010 | Bailey et al. .......... 156/523 |
| 7,673,378 | B1 | * | 3/2010 | Weiner .......... 29/417 |
| 7,765,653 | B1 | * | 8/2010 | Weiner .......... 26/2 R |
| 7,968,165 | B2 | | 6/2011 | Barnes |
| 8,145,345 | B2 | * | 3/2012 | Magee et al. .......... 700/131 |
| 8,155,776 | B2 | | 4/2012 | Bittner et al. |
| 8,361,581 | B2 | | 1/2013 | Tick et al. |
| 8,644,976 | B2 | | 2/2014 | Bittner et al. |
| 8,769,897 | B2 | | 7/2014 | Kikuchi et al. |
| 8,898,879 | B2 | | 12/2014 | Hussmann |
| 2002/0136855 | A1 | * | 9/2002 | Daniel et al. .......... 428/44 |
| 2003/0037508 | A1 | * | 2/2003 | Kobayashi et al. .......... 52/747.11 |
| 2003/0071051 | A1 | | 4/2003 | Martinsen .......... 242/588.3 |
| 2003/0118774 | A1 | | 6/2003 | Tippett et al. |
| 2003/0136069 | A1 | | 7/2003 | Geissler |
| 2003/0190450 | A1 | * | 10/2003 | Daniel et al. .......... 428/89 |
| 2004/0045240 | A1 | | 3/2004 | McIlvaine |
| 2004/0253408 | A1 | | 12/2004 | Hutchison |
| 2005/0048253 | A1 | | 3/2005 | Nord et al. |
| 2005/0166498 | A1 | | 8/2005 | Oakey et al. |
| 2005/0210791 | A1 | * | 9/2005 | Oakey et al. .......... 52/311.1 |
| 2005/0249924 | A1 | | 11/2005 | Reichwein et al. |
| 2005/0252132 | A1 | | 11/2005 | Sieber et al. .......... 428/40.1 |
| 2006/0040089 | A1 | * | 2/2006 | Daniel et al. .......... 428/88 |
| 2006/0240210 | A1 | | 10/2006 | Daniel et al. |
| 2006/0275578 | A1 | | 12/2006 | Jones |
| 2007/0260352 | A1 | * | 11/2007 | Magee et al. .......... 700/131 |
| 2008/0041286 | A1 | | 2/2008 | Tick et al. |
| 2008/0176019 | A1 | | 7/2008 | Bragdon |
| 2008/0193698 | A1 | * | 8/2008 | Oakey et al. .......... 428/44 |
| 2008/0294272 | A1 | | 11/2008 | Bittner et al. |
| 2009/0095428 | A1 | | 4/2009 | Schwertfeger et al. .......... 156/510 |
| 2009/0202778 | A1 | | 8/2009 | McGee |
| 2009/0260307 | A1 | | 10/2009 | Thiers |
| 2009/0304974 | A1 | * | 12/2009 | Tick et al. .......... 428/44 |
| 2010/0272943 | A1 | | 10/2010 | Ddamulira .......... 428/40.1 |
| 2010/0300625 | A1 | | 12/2010 | Hardy .......... 156/523 |
| 2010/0323169 | A1 | | 12/2010 | Son et al. |
| 2010/0330327 | A1 | * | 12/2010 | Oakey et al. .......... 428/89 |
| 2012/0114914 | A1 | * | 5/2012 | Tick et al. .......... 428/195.1 |
| 2013/0222423 | A1 | | 8/2013 | Fields et al. |
| 2013/0230682 | A1 | | 9/2013 | Duncan et al. |
| 2013/0316117 | A1 | | 11/2013 | Tick, Jr. et al. |
| 2014/0037885 | A1 | | 2/2014 | Oakey |
| 2014/0109502 | A1 | | 4/2014 | Bittner et al. |
| 2014/0260032 | A1 | | 9/2014 | Managan |

FOREIGN PATENT DOCUMENTS

| | | |
|---|---|---|
| CA | 2807853 | 3/2013 |
| CN | 1162045 | 10/1997 |
| CN | 1729899 A | 2/2006 |
| CN | 2793202 | 7/2006 |
| CN | 201310067083.1 | 3/2013 |
| CN | 104042095 | 9/2014 |
| DE | 3328528 | 6/1985 |
| GB | 1007281 | 6/1964 |
| JP | 02-274958 | 11/1990 |
| JP | 02-274959 | 11/1990 |
| JP | H0716141 A | 1/1995 |
| JP | 2005-325665 A | 11/2005 |
| JP | 2010259649 A | 11/2010 |
| SG | 201301562-3 | 3/2013 |
| SG | 10201404887Q | 8/2014 |
| TH | 1301000993 | 2/2013 |
| TW | 201441462 A | 11/2014 |
| WO | WO 90/01411 | 2/1990 |
| WO | WO 00/77111 | 12/2000 |
| WO | WO-02/064879 A2 | 8/2002 |
| WO | WO-03/103944 A1 | 12/2003 |
| WO | WO 03103944 A1 * | 12/2003 |
| WO | WO 2006/044928 | 4/2006 |
| WO | WO-2007/030320 | 3/2007 |
| WO | WO-2009/148423 A1 | 12/2009 |
| WO | WO 2010/018425 | 2/2010 |
| WO | WO-2010/144902 A2 | 12/2010 |

OTHER PUBLICATIONS

First Office Action issued by the Canadian Intellectual Property Office on May 7, 2014, for application CA 2,807,853, filed on Mar. 1, 2013 (Applicant—Shaw Industries Group, Inc. // Inventor—Duncan et al.) (2 pages).

Second Office Action issued by the Canadian Intellectual Property Office on Feb. 23, 2015, for application CA 2,807,853, filed on Mar. 1, 2013 (Applicant—Shaw Industries Group, Inc. // Inventor—Duncan et al.) (5 pages).

Examination Report issued Jul. 1, 2015 by the Intellectual Property Office of Singapore for application No. 2013015623, which was filed on Mar. 1, 2013 and published as 193132 on Sep. 30, 2013 (Applicant—Shaw Industries group, Inc. // Inventor—Duncan et al.) (10 pages).

Non-Final Office Action issued on Sep. 19, 2012 by the U.S. Patent & Trademark Office for U.S. Appl. No. 13/526,155, filed Jun. 18, 2012, published as 2013-0230682 on Sep. 5, 2013 (Applicant—Columbia Insurance Co. // Inventor—Duncan, et al.) (9 pages).

(56) References Cited

OTHER PUBLICATIONS

Amendment in Response to Non-Final Office Action filed on Dec. 14, 2012 with the U.S. Patent & Trademark Office for U.S. Appl. No. 13/526,155, filed Jun. 18, 2012, published as 2013-0230682 on Sep. 5, 2013 (Applicant—Columbia Insurance Co. // Inventor—Duncan et al.) (16 pages).
Final Office Action issued on Feb. 11, 2013 by the U.S. Patent & Trademark Office for U.S. Appl. No. 13/526,155, filed Jun. 18, 2012, published as 2013-0230682 on Sep. 5, 2013 (Applicant—Columbia Insurance Co. // Inventor—Duncan et al.) (9 pages).
Amendment in Response to Final Office Action filed on May 15, 2013 with the U.S. Patent & Trademark Office for U.S. Appl. No. 13/526,155, filed Jun. 18, 2012, published as 2013-0230682 on Sep. 5, 2013 (Applicant—Columbia Insurance Co. // Inventor—Duncan et al.) (18 pages).
Non-Final Office Action issued on Jul. 18, 2013 by the U.S. Patent & Trademark Office for U.S. Appl. No. 13/526,155, filed Jun. 18, 2012, published as 2013-0230682 on Sep. 5, 2013 (Applicant—Columbia Insurance Co. // Inventor—Duncan et al.) (13 pages).
Amendment in Response to Non-Final Office Action filed on Jan. 20, 2014 with the U.S. Patent & Trademark Office for U.S. Appl. No. 13/526,155, filed Jun. 18, 2012, published as 2013-0230682 on Sep. 5, 2013 (Applicant—Columbia Insurance Co. // Inventor—Duncan et al.) (20 pages).
Final Office Action issued on Apr. 11, 2014 by the U.S. Patent & Trademark Office for U.S. Appl. No. 13/526,155, filed Jun. 18, 2012, published as 2013-0230682 on Sep. 5, 2013 (Applicant—Columbia Insurance Co. // Inventor—Duncan et al.) (9 pages).
Amendment and Response to Final Office Action filed on Jun. 11, 2014 with the U.S. Patent & Trademark Office for U.S. Appl. No. 13/526,155, filed Jun. 18, 2012, published as 2013-0230682 on Sep. 5, 2013 (Applicant—Columbia Insurance Co. // Inventor—Duncan et al.) (12 pages).
Advisory Action issued Jun. 19, 2014 by the U.S. Patent & Trademark Office for U.S. Appl. No. 13/526,155, filed Jun. 18, 2012, published as 2013-0230682 on Sep. 5, 2013 (Applicant—Columbia Insurance Co. // Inventor—Duncan et al.) (4 pages).
Notice of Appeal filed Oct. 10, 2014 with the U.S. Patent & Trademark Office for U.S. Appl. No. 13/526,155, filed Jun. 18, 2012, published as 2013-0230682 on Sep. 5, 2013 (Applicant—Columbia Insurance Co. // Inventor—Duncan et al.) (1 page).
Amendment and Response to Final Office Action filed on Feb. 18, 2015 by the U.S. Patent & Trademark Office for U.S. Appl. No. 13/526,155, filed Jun. 18, 2012, published as 2013-0230682 on Sep. 5, 2013 (Applicant—Columbia Insurance Co. // Inventor—Duncan, et al.) (13 pages).
Non-Final Office Action issued on Mar. 20, 2015 by the U.S. Patent & Trademark Office for U.S. Appl. No. 13/526,155, filed Jun. 18, 2012, published as 2013-0230682 on Sep. 5, 2013 (Applicant—Columbia Insurance Co. // Inventor—Duncan et al.) (16 pages).
Final Office Action issued on Sep. 30, 2015 by the U.S. Patent & Trademark Office for U.S. Appl. No. 13/526,155, filed Jun. 18, 2012 and published as US-2013-0230682 on Sep. 5, 2013 (Applicant—Columbia Insurance Co. // Inventor—Duncan, et al.) (14 pages).
Non-Final Office Action issued on Jul. 23, 2014 by the U.S. Patent & Trademark Office for U.S. Appl. No. 14/197,854, filed Mar. 5, 2014 and published as US-2014-0260032-A1 on Sep. 18, 2014 (Applicant—Columbia Insurance Co. // Inventor—Managan, et al.) (11 pages).
Response to Non-Final Office Action filed on Dec. 19, 2014 for U.S. Appl. No. 14/197,854, filed Mar. 5, 2014 and published as US-2014-0260032-A1 on Sep. 18, 2014 (Applicant—Columbia Insurance Co. // Inventor—Managan, et al.) (7 pages).
Non-Final Office Action issued on Jan. 30, 2015 by the U.S. Patent & Trademark Office for U.S. Appl. No. 14/197,854, filed Mar. 5, 2014 and published as US-2014-0260032-A1 on Sep. 18, 2014 (Applicant—Columbia Insurance Co. // Inventor—Managan, et al.) (13 pages).
Response to Non-Final Office Action filed on Jul. 30, 2015 for U.S. Appl. No. 14/197,854, filed Mar. 5, 2014 and published as US-2014-0260032-A1 on Sep. 18, 2014 (Applicant—Columbia Insurance Co. // Inventor—Managan, et al.) (15 pages).
Final Office Action issued on Sep. 22, 2015 by the U.S. Patent & Trademark Office for U.S. Appl. No. 14/197,854, filed Mar. 5, 2014 and published as US-2014-0260032-A1 on Sep. 18, 2014 (Applicant—Columbia Insurance Co. // Inventor—Managan, et al.) (26 pages).
U.S. Appl. No. 13/526,155, filed Jun. 18, 2012, Duncan.

* cited by examiner

PATTERN CARPET TILES AND METHODS OF MAKING AND USING SAME

BACKGROUND OF THE INVENTION

The invention relates in general to pattern carpet tile. More particularly, the invention relates to pattern carpet tiles that cooperatively define a floor covering in which a contrast pattern of a given carpet tile achieves a desired visual appearance relative to contrast patterns of adjacent carpet tiles.

FIELD OF THE INVENTION

Conventional carpet tile has historically been a product that sought to mimic the appearance of broadloom carpet and to hide or at least de-emphasize the fact that the product was modular. Carpet tile and other textile face modular flooring conventionally has been highly uniform in size, shape, and appearance and has had edge structures that present a uniform floor covering when edges of adjacent tiles are abutting.

Some more recent carpet tile designs and patterns have provided carpet tiles that can be positioned at any rotational position relative to adjacent tiles without disrupting the overall pattern of the floor covering. Thus, for these floor coverings, regardless of the rotational position of each respective tile, the same overall visual effect is achieved.

There is a need for modular floor designs that are not restricted to a single, consistent overall appearance. Consequently, there remains a need for modular flooring tiles that cooperate to produce distinct visual effects within a floor covering, thereby varying the overall appearance and visual effect of the floor covering depending upon the particular rotational positions of the tile.

SUMMARY OF THE INVENTION

The present invention is generally directed to carpet tiles having first and second end edges and first and second side edges. The distance between the first and second side edges of each carpet tile correspond to a width of the carpet tile. Each carpet tile includes a first portion having a background pattern of at least two colors. Each carpet tile further includes a second portion having a contrast pattern intermixed with a portion of the background pattern. The contrast pattern has at least one contrast color that is different from the colors of the background pattern. The second portion of each carpet tile is positioned proximate a selected side edge of the carpet tile. In exemplary aspects, the ratio between the width of each carpet tile and the width of the second portion of each carpet tile ranges from about 2.5:1 to about 20:1. The carpet tiles disclosed herein can be positioned on a flooring surface to define a floor covering. Methods of forming a floor covering using the carpet tiles disclosed herein are also provided.

One skilled in the art will appreciate that tile-forming cuts cannot easily be positioned with precision relative to features on the face of a floor covering web. However, as a practical matter, it can be predicted (in the sense that it is reasonably possible to insure) that the cuts in a tufted or fusion bonded face floor covering web, and therefore the tile edges produced by such cuts, will fall within predetermined longitudinal and cross-web bands or regions of the formed carpet web. By utilizing these bands or regions to define what will become "design" or "contrast" carpet tile areas (which have the more prominent design elements), and by producing webs with relatively uniform appearance in the bands or regions outside the "design" or "contrast" carpet tile areas, it is possible to produce attractive carpet tiles with prominent, generally edge oriented design elements and to produce visually attractive installations of such carpet tiles that differ significantly in appearance from prior installations of carpet tile. In one aspect, while such installations can have visually prominent modularity in that there is a one-to-one correspondence between visually prominent design elements and the carpet tiles, the appearance of the installation can mimic a broadloom carpet or an area rug having relatively large scale. Such an attractive installation is particularly possible utilizing, together with the carpet tiles of this invention, "plain" tiles, the entire surfaces of which are a background design such as the design that appears in the frame bands in "background" or "field" or regions of tiles having other design elements.

Because the "design" or "contrast" carpet tile areas is positioned at and extends inwardly from an edge of the carpet tile, it is contemplated that cuts on similar tiles do not necessarily have to formed such that the "design" or "contrast" carpet tile areas on the respective tiles can vary from tile to tile. In some aspects, at least some of the design elements area on otherwise like tiles can vary, and in an installation of such tiles some tiles might appear to have misplaced design carpet tile areas. It is contemplated that an assembly of such tiles with design" or "contrast" carpet tile areas positioned at and extends inwardly from an edge of the carpet tile can appear to a viewer to be intentional and attractive. In some aspects, such intentional, attractive variation of tile appearance can also be achieved by using design elements having different sizes, shapes or other features of appearance within the "design" or "contrast" carpet tile areas as well as differing off-edge positioning.

BRIEF DESCRIPTION OF THE DRAWINGS

The accompanying drawings, which are incorporated in and constitute a part of this specification, illustrate several aspects described below and together with the description, serve to explain the principles of the invention. Like numbers represent the same elements throughout the figures. The patent or application file contains at least one drawing executed in color. Copies of this patent or patent application publication with color drawing(s) will be provide by the Office upon request and the payment of the necessary fee.

FIG. 1 displays an exemplary carpet tile having an abstract contrast pattern as described herein. FIGS. 2-3 display exemplary carpet tiles having contrast patterns formed of a plurality of parallel stripes as described herein.

DETAILED DESCRIPTION OF THE INVENTION

Figure 1:
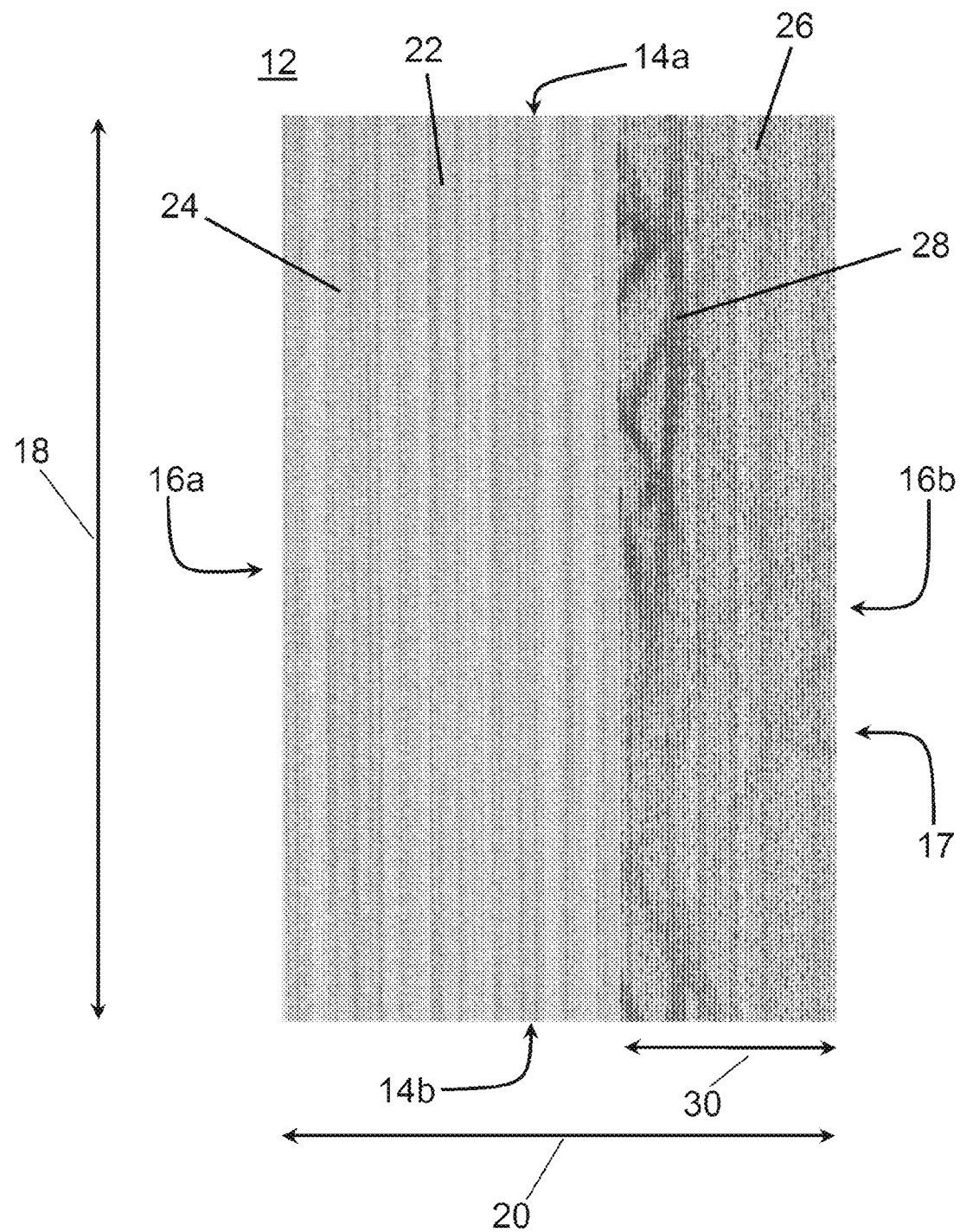
FIGS. 1-3 are top views of exemplary carpet tiles as described herein.

The present invention can be understood more readily by reference to the following detailed description, examples, drawing, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms "a," "an" and "the" include plural referents unless the context clearly dictates otherwise. Thus, for example, reference to "a tufting needle" can include two or more such tufting needles unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

As used throughout, the term "carpet tile" refers to carpet tiles and other conventional textile-face modular flooring tiles.

As used herein, the definition of the term "color" is referenced in terms of the CIELAB color scale, which was created by the International Commission on Illumination (CIE). The CIELAB color scale provides a uniform scale for measuring and comparing the color values of different samples. Three different color measurements are used to determine the CIELAB color value of a given sample: 1) a white-black color measurement; 2) a red-green color measurement; and 3) a yellow-blue color measurement. The white-black color measurement represents the amount of white present in the sample relative to the amount of black present in the sample. The red-green color measurement represents the amount of red present in the sample relative to the amount of green present in the sample. The yellow-blue color measurement represents the amount of yellow present in the sample relative to the amount of blue present in the sample. CIELAB color scale values can be obtained using color measurement instruments known in the art, including, for example, HunterLab color measurement instruments.

As used throughout, the terms "tuft", "tufting", "tufted", "tufted-in", and other verb tenses thereof refer to inserting, pressing, passing, and/or any other conventional process by which yarn is attached or otherwise coupled to the carpet backing.

In one aspect, and as shown in FIGS. 5A-13B, a methodology is provided for forming a floor covering 10. The floor covering 10 can be formed from a plurality of carpet tiles 12 as further described herein. In exemplary aspects, the plurality of carpet tiles 12 can be configured for selective positioning relative to one another to thereby produce a desired visual appearance.

In one aspect, and as shown in FIG. 1, a carpet tile 12 is provided having first and second end edges 14a, 14b and first and second side edges 16a, 16b. In this aspect, it is contemplated that the distance between the first and second end edges 14a, 14b of the carpet tile 12 can correspond to a length 18 of the carpet tile. It is further contemplated that the distance between the first and second side edges 16a, 16b of the carpet tile 12 can correspond to a width 20 of the carpet tile.

In exemplary aspects, the carpet tile 12 can be substantially rectangular (having a length 18 and a width 20 that are substantially different). It is also contemplated that the carpet tile 12 can be substantially square (having a length 18 and a width 20 that are substantially equal). However, it is contemplated that the carpet tile 12 can have any desired shape, including a desired conventional shape or a desired irregular and/or organic shape. In further exemplary aspects, it is contemplated that the carpet tile 12 can have a tufted face, a woven face, or a fusion-bonded face that is formed according to conventional methods. In an additional exemplary aspect, it is contemplated that at least a portion of the face of the carpet tile 12 can be printed using conventional methods.

In another aspect, the carpet tile 12 can comprise a first portion 22 having a background pattern 24 comprising at least two colors. In this aspect, the at least two colors of the background pattern 24 of the carpet tile 12 can comprise a majority color and a minority color. In exemplary aspects, the first portion 22 of the carpet tile 12 can extend the entire length 18 of the carpet tile.

Figure 2:
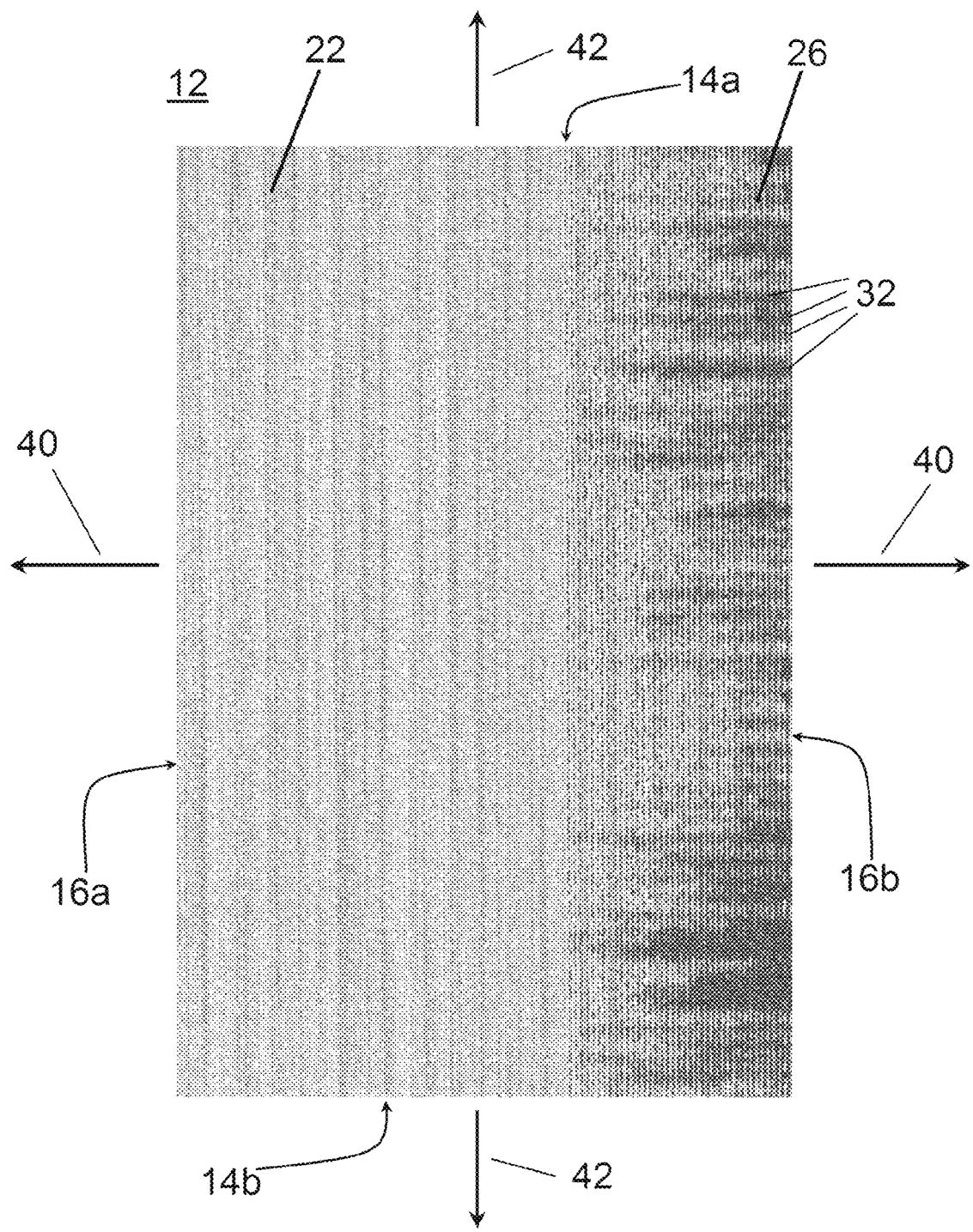
Figure 3:
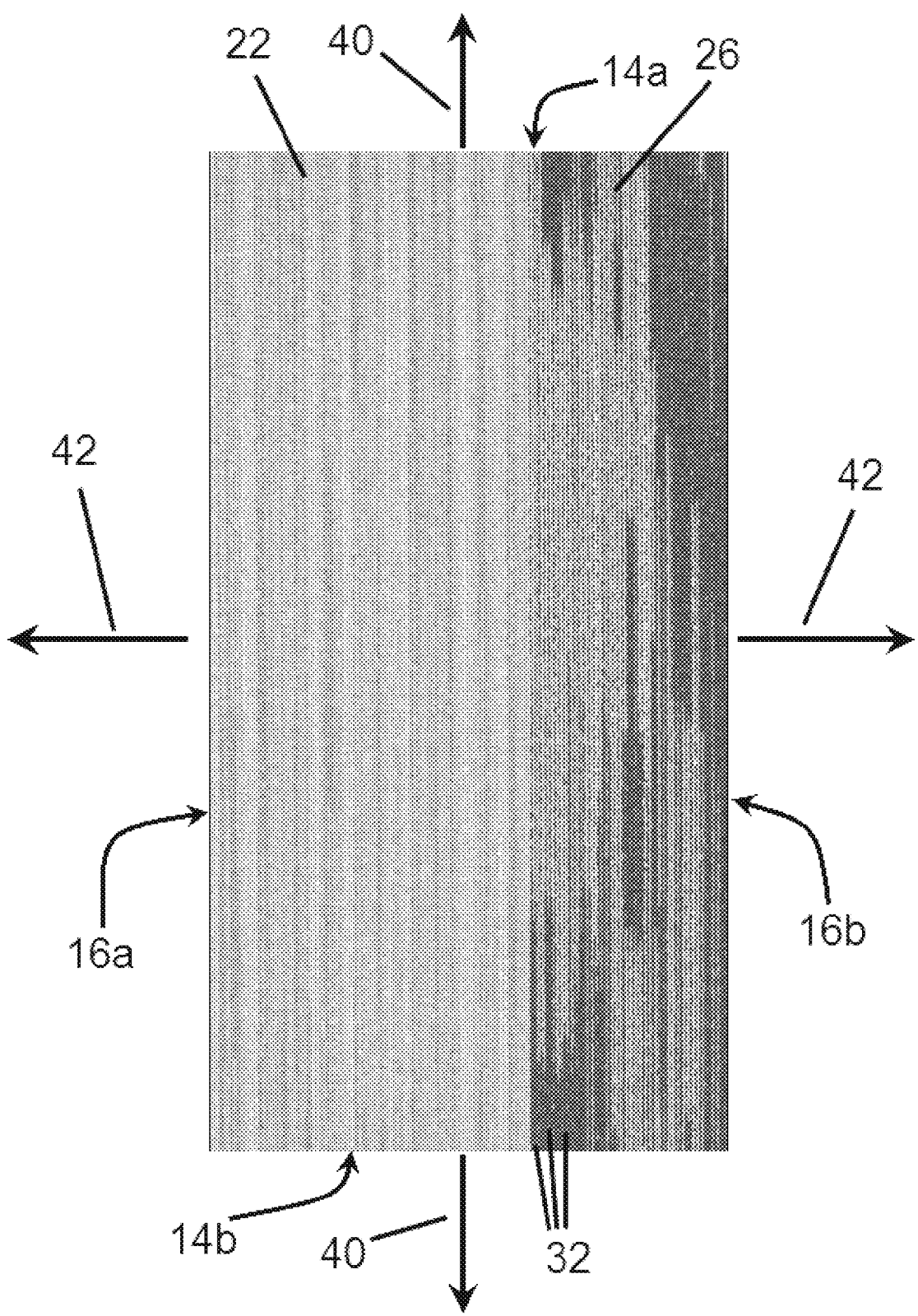

In an additional aspect, the carpet tile 12 can further comprise a second portion 26 having a contrast pattern 28 intermixed with a portion of the background pattern 24. In this aspect, as shown in FIG. 1, the second portion 26 can be positioned proximate a selected side edge 17 of the carpet tile 12. It is contemplated that at least a portion of the contrast pattern 28 can be spaced from the selected side edge 17. Alternatively, it is contemplated that at least a portion of the contrast pattern 28 can extend to the selected side edge 17. It is further contemplated that, in exemplary aspects, the majority of the contrast pattern 28 can be positioned proximate the selected side edge 17. In a further aspect, the contrast pattern 28 can comprise at least one contrast color that is different than the at least two colors of the background pattern 24. In this aspect, the contrast pattern 28 can comprise the minority color of the background pattern 24 and at least one contrast color that is different from the majority color and the minority color of the background pattern. It is understood that a difference between a first color and a second color as described herein can exist even though the first color is achieved by one or more yarns that are also used to achieve the second color, provided the first color and the second color, as visually perceived by an observer, are visibly different. In an additional aspect, as shown in FIGS. 2-3, it is contemplated that the contrast pattern can comprise a plurality of parallel stripes. In still another aspect, as shown in FIG. 1, it is contemplated that the contrast pattern 28 can comprise an abstract pattern. However, it is contemplated that the contrast pattern can comprise any combination of colors and/or shapes, such as, for example and without limitation, squares, circles, and the like, that achieve a desired visual appearance when positioned in a selected location within a floor covering. In an exemplary aspect, it is contemplated that the contrast pattern 28 can be printed on the carpet tile 12 using conventional methods.

In another aspect, the second portion 26 of the carpet tile 12 can have a width 30. In this aspect, it is contemplated that the width 30 of the second portion 26 of the carpet tile 12 can be about 40% or less of the total width 20 of the carpet tile. However, it is also contemplated that the width 30 of the second portion 26 of the carpet tile 12 can optionally be about 50% of the total width 20 of the carpet tile. It is still further contemplated that the width 30 of the second portion 26 of the carpet tile can optionally be greater than 50% of the total width 20 of the carpet tile. In an exemplary aspect, it is contemplated that the ratio of the width 20 of the carpet tile 12 to the width 30 of the second portion 26 of the carpet tile can range from about 2.5:1 to about 20:1. However, when the width 30 of the second portion 26 is greater than 50% of the total width 20 of the carpet tile 12, then it is contemplated that the first portion of the carpet tile 12 can have a width, and the ratio of the width 20 of the carpet tile 12 to the width of the first portion of the carpet tile can range from about 2.5:1 to about 20:1. In another exemplary aspect, the second portion 26 of the carpet tile 12 can extend the entire length 18 of the carpet tile.

In a further aspect, it is contemplated that the second portion 26 of the carpet tile 12 can extend proximate select portions of the first and second end edges 14a, 14b. In this aspect, it is contemplated that the second portion 26 can optionally extend to at least one of the end edges 14a, 14b. It is further contemplated that the second portion 26 can optionally be spaced from at least one of the end edges 14a, 14b.

In one aspect, it is contemplated that the background pattern 24 and the contrast pattern 28 can each be formed from a plurality of yarn tufts using conventional tufting methods. In this aspect, within the contrast pattern 28, at least some of the yarn tufts of the at least one contrast color can have a height that is greater than a height of at least some of the yarn tufts of the minority color proximate the yarn tufts of the at least one contrast color. It is further contemplated that, within the contrast pattern, at least some of the yarn tufts of the at least one contrast color can have a height that is substantially equal to the height of at least some of the yarn tufts of the minority color proximate the yarn tufts of the at least one contrast color. It is still further contemplated that, within the contrast pattern, at least some of the yarn tufts of the at least one contrast color can have a height that is less than the height of at least some of the yarn tufts of the minority color proximate the yarn tufts of the at least one contrast color.

Figure 4A:
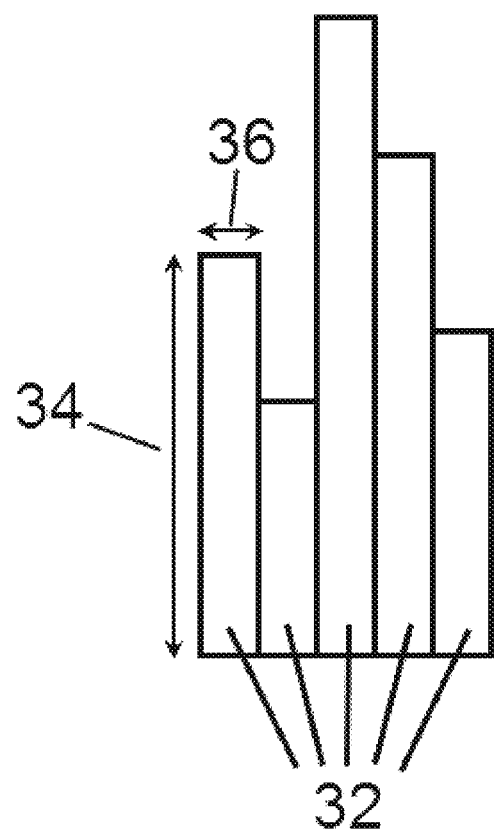
FIGS. 4A-4C display exemplary stripe configurations for contrast patterns thereon various exemplary carpet tiles as described herein.
Figure 4B:
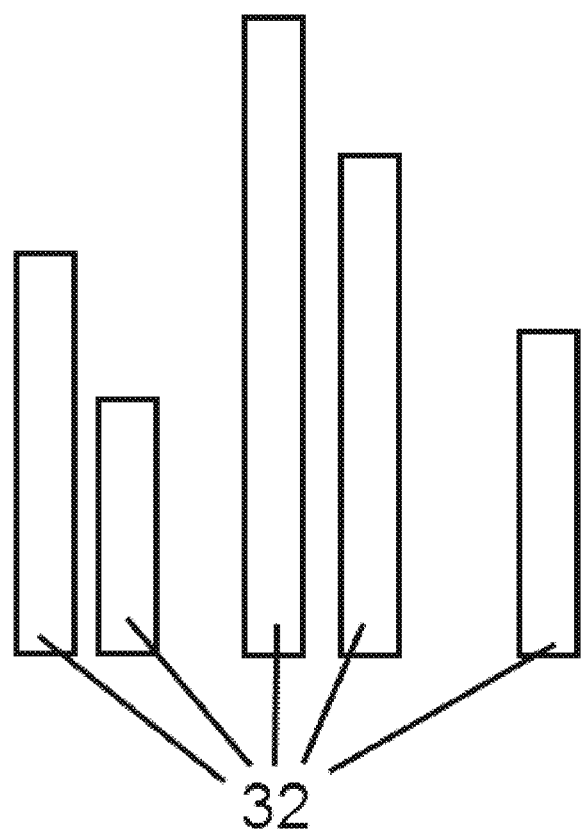
Figure 4C:
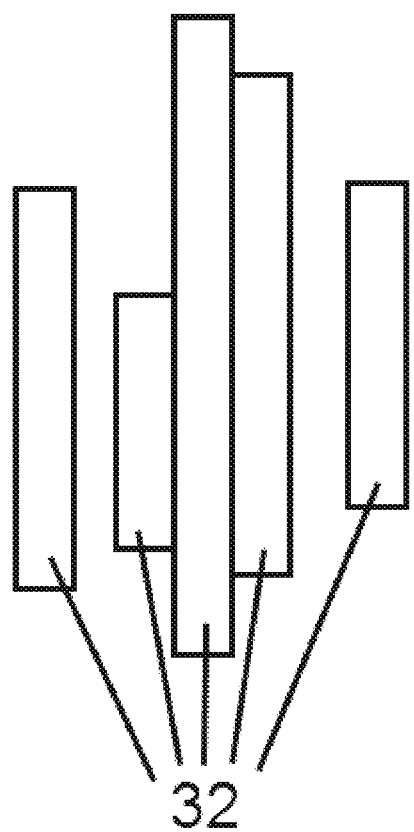

In various exemplary aspects, as shown in FIG. 3, the carpet tile 12 can optionally have a warp axis 40 extending between the first end edge 14a and the second end edge 14b of the carpet tile and a weft axis 42 extending between the first side edge 16a and the second side edge 16b of the carpet tile. In these aspects, as shown in FIGS. 3 and 4A-4C, the contrast pattern 28 can comprise a plurality of substantially parallel stripes 32. It is contemplated that each stripe 32 of the plurality of stripes can have an elongate length 34 extending parallel to the warp axis 40 of the carpet tile 12 and a width 36 extending parallel to the weft axis 42 of the carpet tile. It is further contemplated that the elongate length 34 of each stripe 32 can be greater than the width 36 of each respective stripe of the plurality of stripes. In an exemplary aspect, at least one pair of adjacent stripes of the plurality of stripes can have a substantially equal length. In another exemplary aspect, at least one pair of adjacent stripes of the plurality of stripes can have a substantially equal width. In still another exemplary aspect, as shown in FIG. 4A, the respective elongate lengths 34 of the plurality of stripes 32 can be randomized among the plurality of stripes. In still another exemplary aspect, the respective widths 36 of the plurality of stripes 32 can be randomized among the plurality of stripes. In still another exemplary aspect, at least two adjacent stripes of the plurality of stripes can be spaced apart along the weft axis 42 of the carpet tile 12 as shown in FIG. 4B. In yet another exemplary aspect, at least two adjacent stripes of the plurality of stripes can be staggered along the warp axis 40 of the carpet tile 12 as shown in FIG. 4C.

In other exemplary aspects, as shown in FIG. 2, the carpet tile 12 can optionally have a warp axis 40 extending between the first side edge 16a and the second side edge 16b of the carpet tile and a weft axis 42 extending between the first end edge 14a and the second end edge 14b of the carpet tile. In these aspects, as shown in FIGS. 2 and 4A-4C, the contrast pattern 28 can comprise a plurality of substantially parallel stripes 32. It is contemplated that each stripe 32 of the plurality of stripes can have an elongate length 34 extending parallel to the weft axis 42 of the carpet tile 12 and a width 36 extending parallel to the warp axis 40 of the carpet tile. It is further contemplated that the elongate length 34 of each stripe 32 can be greater than the width 36 of each respective stripe of the plurality of stripes. In an exemplary aspect, at least one pair of adjacent stripes of the plurality of stripes can have a substantially equal length. In another exemplary aspect, at least one pair of adjacent stripes of the plurality of stripes can have a substantially equal width. In still another exemplary aspect, as shown in FIG. 4A, the respective elongate lengths 34 of the plurality of stripes 32 can be randomized among the plurality of stripes. In still another exemplary aspect, the respective widths 36 of the plurality of stripes 32 can be randomized among the plurality of stripes. In still another exemplary aspect, at least two adjacent stripes of the plurality of stripes can be spaced apart along the weft axis 42 of the carpet tile 12 as shown in FIG. 4B. In yet another exemplary aspect, at least two adjacent stripes of the plurality of stripes can be staggered along the warp axis 40 of the carpet tile 12 as shown in FIG. 4C.

In various optional aspects, and referring the FIGS. 1-3, it is contemplated that the carpet or carpet web 12 can be designed and manufactured with design elements located in any portion of the "design" or "contrast" carpet tile areas, i.e., the second portion 26. As one will appreciate, the effective width 30 of the second portion 26 of the web can vary between otherwise like carpet tiles. Thus, the design of the tiles of the present invention allows for variations in the cutting out of the respective tiles without causing violence, however, to the appearance of carpet tile 12, in part because the second portion or optionally the contrast pattern or design elements within the second portion 26 are not necessarily required to be positioned identically in otherwise like carpet tiles 12. In effect, it is contemplated that the slight differences between otherwise like tiles would be celebrated in the assembly of the carpet tiles 12.

In an additional aspect, it is contemplated that the second portion 26 of the carpet tile and/or the contrast pattern 28 or design elements within the second portion 26 of the carpet tile 12 can be produced by any technique causing a visually perceptible result on the face of the respective carpet tile 12, including techniques altering tuft height and appearance, and including yarn color. In one aspect, the selected contrast pattern 28 or design element can be any desired shape or collection of shapes or yarn appearances. Certainly, it is contemplated that some of the benefits of this invention will be enjoyed only if at least some of the contrast pattern 28 or design elements in an installation of tiles intentionally to a selected edge of the second portion of the carpet tile.

As described in more detail below, it is contemplated that a large number of different arrangements of the relative positions of a particular group of tiles is possible when installing tiles on a floor. The design of the distinctive carpet tiles described herein make it possible, indeed, make it easy to create assemblies of tiles of this invention that differ from each other, while achieving the same general appearance if desired. It is also contemplated that additional variations in the appearance of tile installations can be achieved by incorporating into the installation different carpet tiles, such as tiles having only the "background" pattern or color or visual appearance of the first portion 22, or entirely different tiles carrying an entirely different pattern or color or both.

As should also be apparent from the description above and below and examination of the Figures, the details of the design of the carpet tile 12 utilized in these examples are merely exemplary and can be substantially altered without departing from the scope and spirit of this invention. Among other variations possible, the relative area of the face of the second portion 24 with respect the face area of the carpet tile 12 can be changed, the appearance of the design elements or contrast patters positioned within the second portion 24 of the carpet tile 12 can be altered, and the appearance of background or first portion 22 of the carpet tile can be changed.

In one exemplary aspect, the carpet tiles 12 described herein can be formed using conventional type 6 nylon, type 6.6 nylon, polypropylene, polyester, and the like, and the appearance differences in the carpet tiles 12 can be achieved by varying the treadup, color or the height and other properties of the formed tufts or stitches on the carpet tiles. It is also contemplated that different types and/or colors of yarns could also be used, and pattern elements and field or background portion appearances can be achieved utilizing a very wide variety of different conventional and not-yet-developed carpet, fabric and flooring production techniques.

Figure 5A:
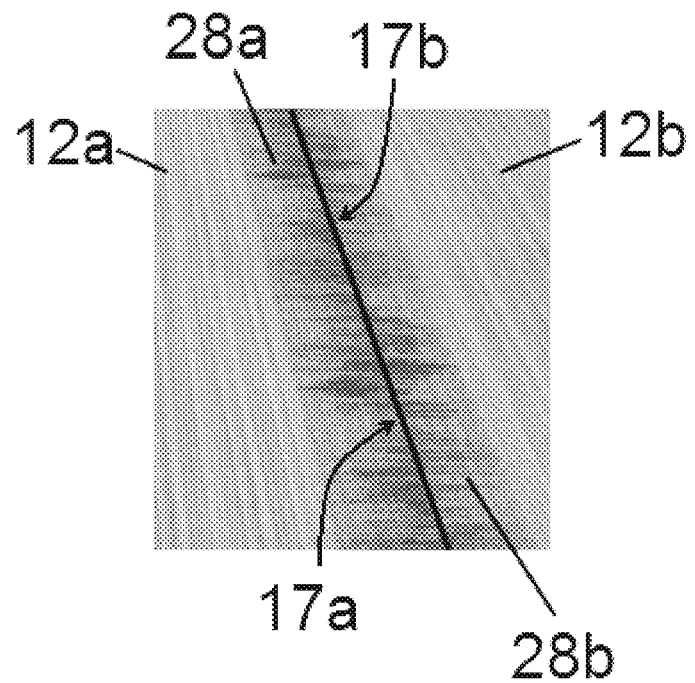
FIGS. 5A-5D display exemplary rotational configurations for the carpet tiles as described herein.
Figure 5B:
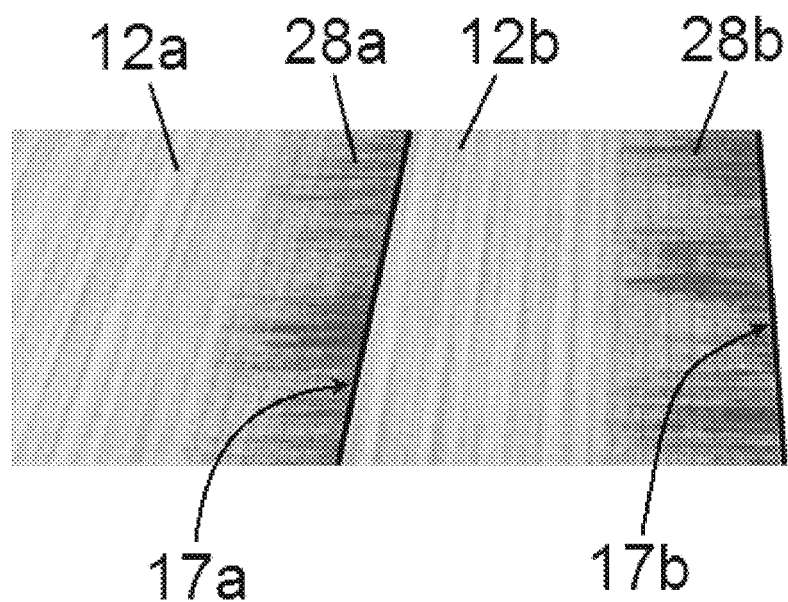
Figure 5C:
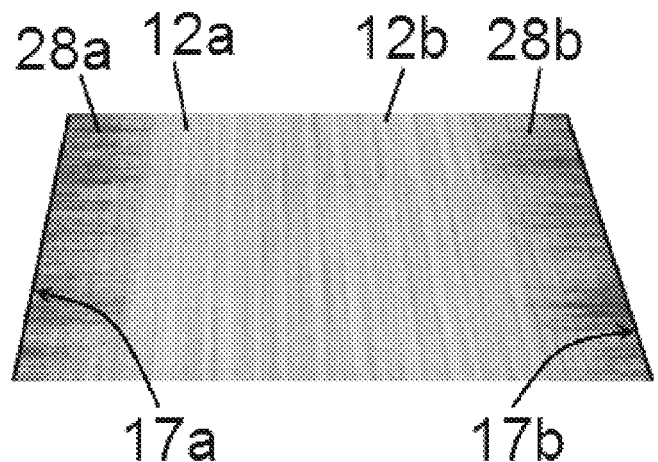
Figure 5D:
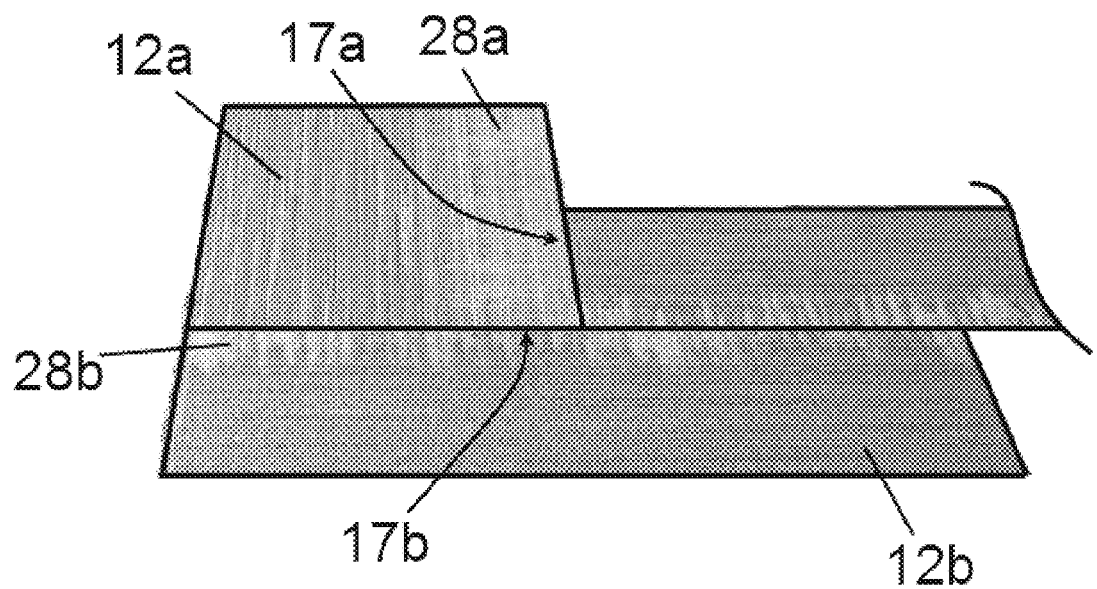
Figure 6A:
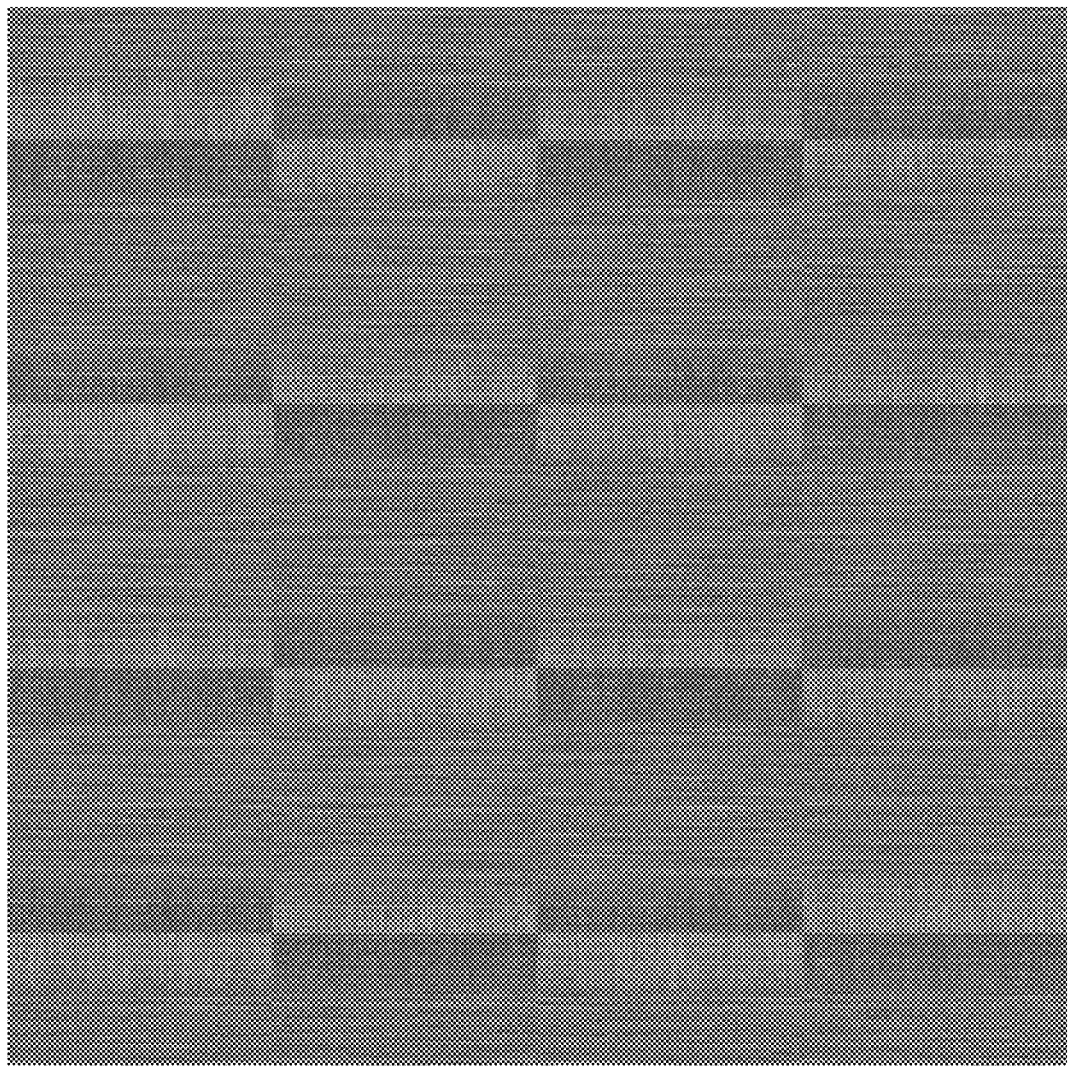
FIGS. 6A-6B respectively display an exemplary floor covering configuration and a corresponding installation key for the displayed floor covering configuration.
Figure 6B:
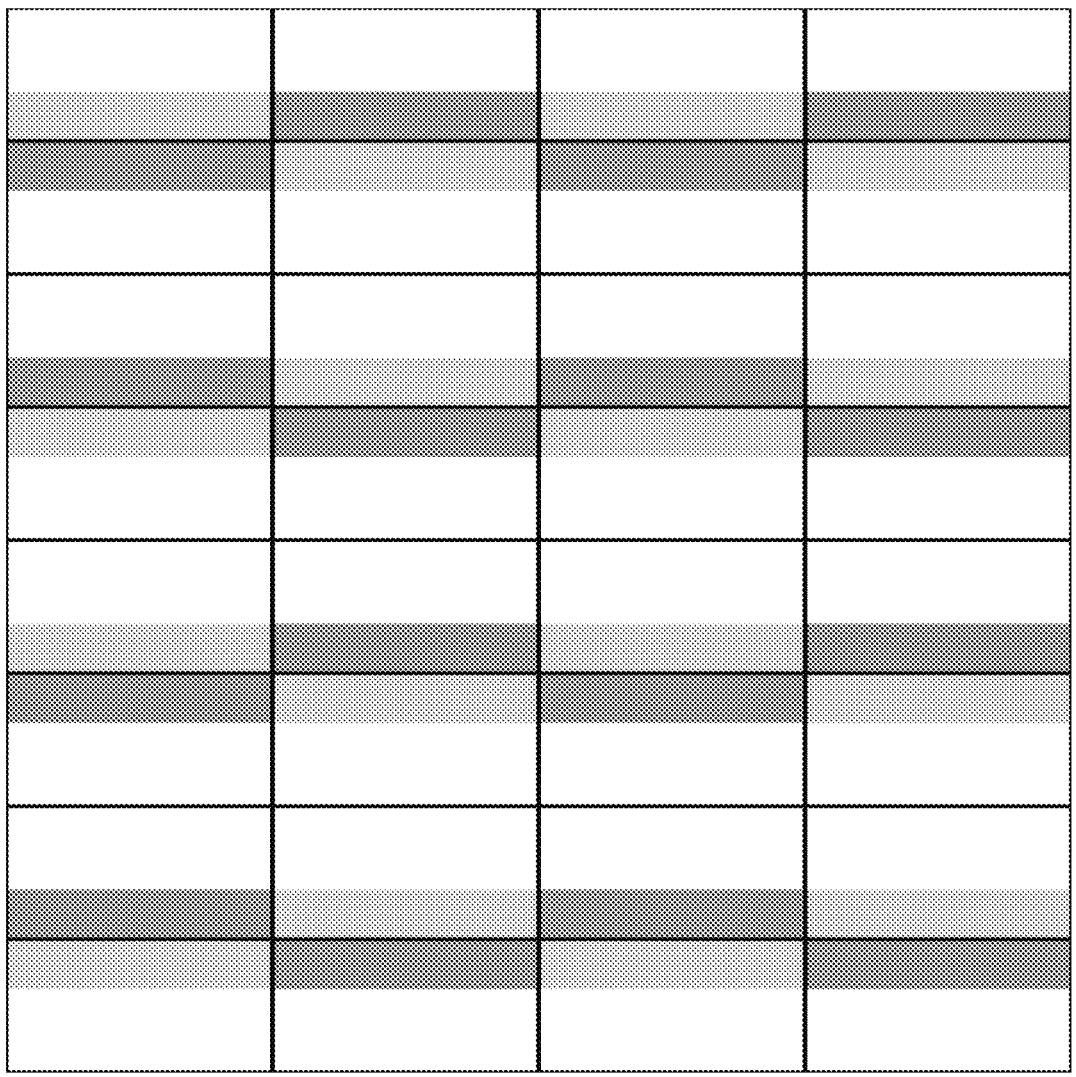

It is contemplated that a plurality of the carpet tiles 12, a floor assembly, can be positioned on a flooring surface to thereby cooperatively define a floor covering 10. In an exemplary aspect, the plurality of carpet tiles 12 can be configured for selective positioning relative to one another such that the contrast pattern 28 of each carpet tile has a desired visual appearance relative to the contrast patterns of adjacent carpet tiles. In this aspect, it is contemplated that the contrast patterns 28 of adjacent carpet tiles can cooperate to produce a desired visual effect proximate one or more selected side edges 17 of the adjacent carpet tiles. In another exemplary aspect, as shown in FIG. 5A, the plurality of carpet tiles 12 can be configured for selective positioning relative to one another such that at least a portion of the selected side edge 17a of a first carpet tile 12a abuts the selected side edge 17b of a second carpet tile 12b and at least a portion of the contrast pattern 28a of the first carpet tile is positioned adjacent the contrast pattern 28b of the second carpet tile. In still another exemplary aspect, as shown in FIGS. 5B-5C, the plurality of carpet tiles can be configured for selective positioning relative to one another such that the selected side edge 17a of a first carpet tile 12a is spaced apart from the selected side edge 17b of a second, adjacent carpet tile 12b and the contrast pattern 28a of the first carpet tile is spaced apart from the contrast pattern 28b of the second carpet tile. In yet another exemplary aspect, as shown in FIG. 5D, the plurality of carpet tiles can be configured for selective positioning relative to one another such that at least a portion of the selected side edge 17a of a first carpet tile 12a abuts an end edge 14a or 14b of an adjacent carpet tile 12b.

An exemplary method for forming a floor covering as described herein can comprise providing a plurality of carpet tiles as described herein. The method can further comprise positioning the plurality of carpet tiles relative to one another on a flooring surface such that the contrast pattern of each carpet tile has a desired visual appearance relative to the contrast patterns of adjacent carpet tiles. In an exemplary aspect, the method for forming the floor covering can comprise selectively positioning the plurality of carpet tiles relative to one another such that at least a portion of the selected side edge of a first carpet tile abuts the selected side edge of a second carpet tile and at least a portion of the contrast pattern of the first carpet tile is positioned adjacent the contrast pattern of the second carpet tile. In another exemplary aspect, the method for forming the floor covering can comprise selectively positioning the plurality of carpet tiles relative to one another such that the selected side edge of a first carpet tile is spaced apart from the selected side edge of a second, adjacent carpet tile and the contrast pattern of the first carpet tile is spaced apart from the contrast pattern of the second carpet tile. In still another exemplary aspect, the method for forming the floor covering can comprise selectively positioning the plurality of carpet tiles relative to one another such that at least a portion of the selected side edge of a first carpet tile abuts an end edge of an adjacent carpet tile.

It is contemplated that the plurality of carpet tiles can be positioned relative to one another to achieve conventional "monolithic," "brick," "boxed in," "basketweave," half basketweave," and "herringbone" floor covering configurations. It is further contemplated that, within these conventional floor covering configurations, each carpet tile of the plurality of carpet tiles can be selectively rotated such that the contrast patterns of adjacent carpet tiles achieve the desired visual appearance.

It is contemplated that the selected position of each carpet tile of the plurality of carpet tiles can be determined based purely upon the appearance of the face of the carpet tile, particularly the appearance of at least one edge portion of the carpet tile. It is further contemplated that the selected position of each carpet tile within a floor covering can be determined entirely without reference to arrows imprinted on the back side of the tiles, as is conventionally done in the art. Thus, it is still further contemplated that the disclosed carpet tiles can permit customized, non-conventional floor covering designs that are achieved through a particular, selected arrangement of carpet tiles in which the contrast portions of adjacent carpet tiles cooperate to achieve the desired visual appearance. Exemplary non-conventional floor covering configurations and their corresponding installation keys are provided in FIGS. 6A-13B.

Figure 7A:
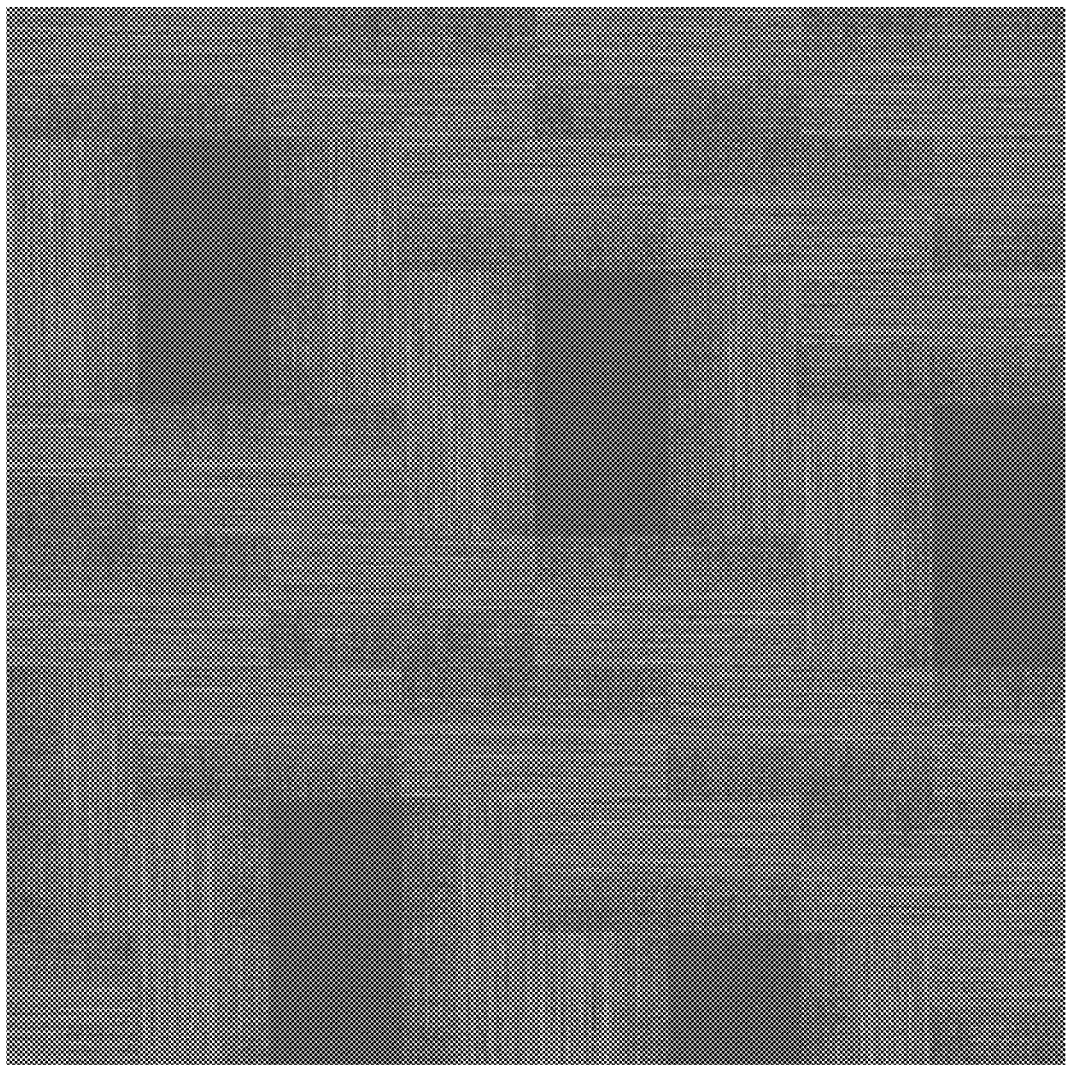
FIGS. 7A-7B respectively display an exemplary floor covering configuration and a corresponding installation key for the displayed floor covering configuration.
Figure 7B:
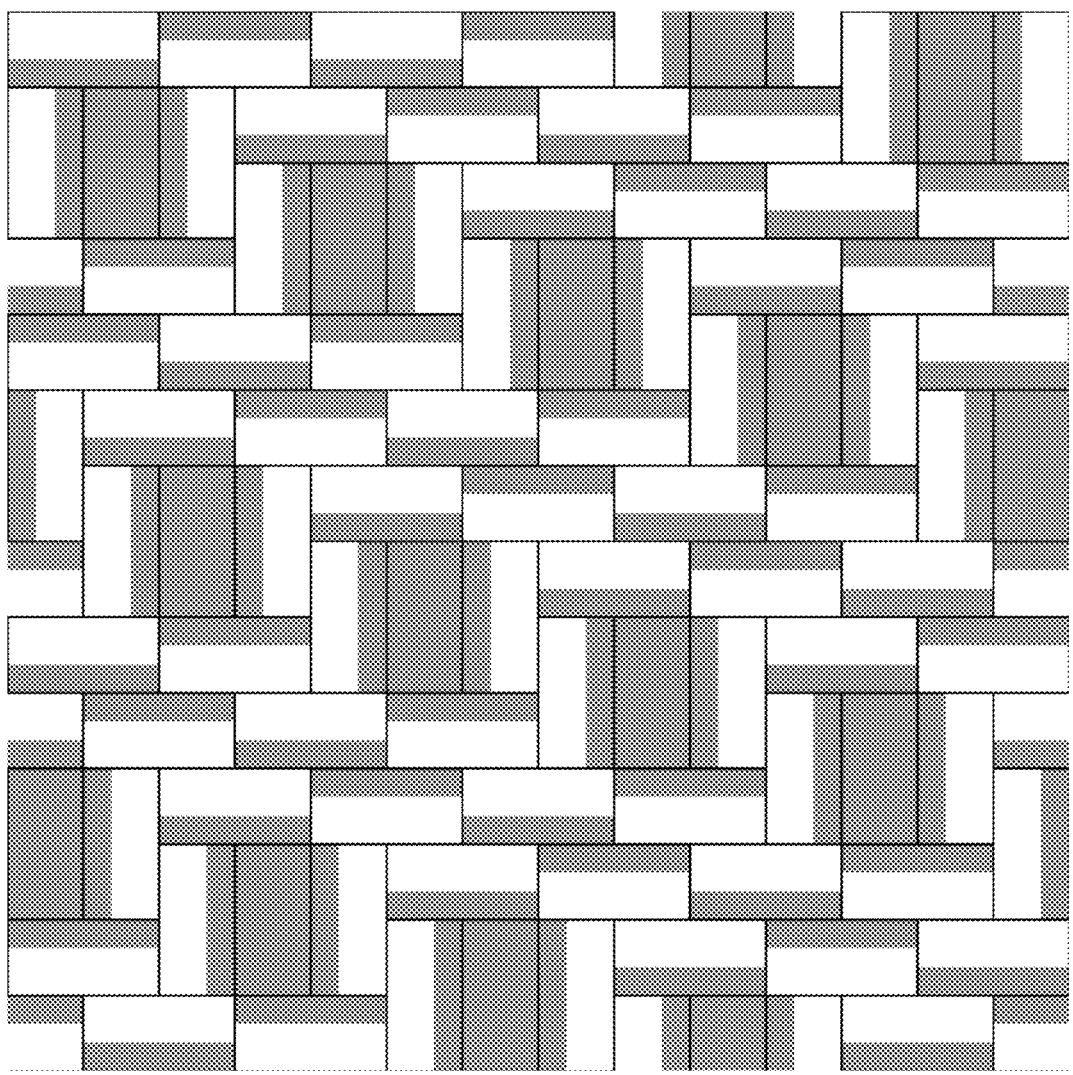
Figure 8A:
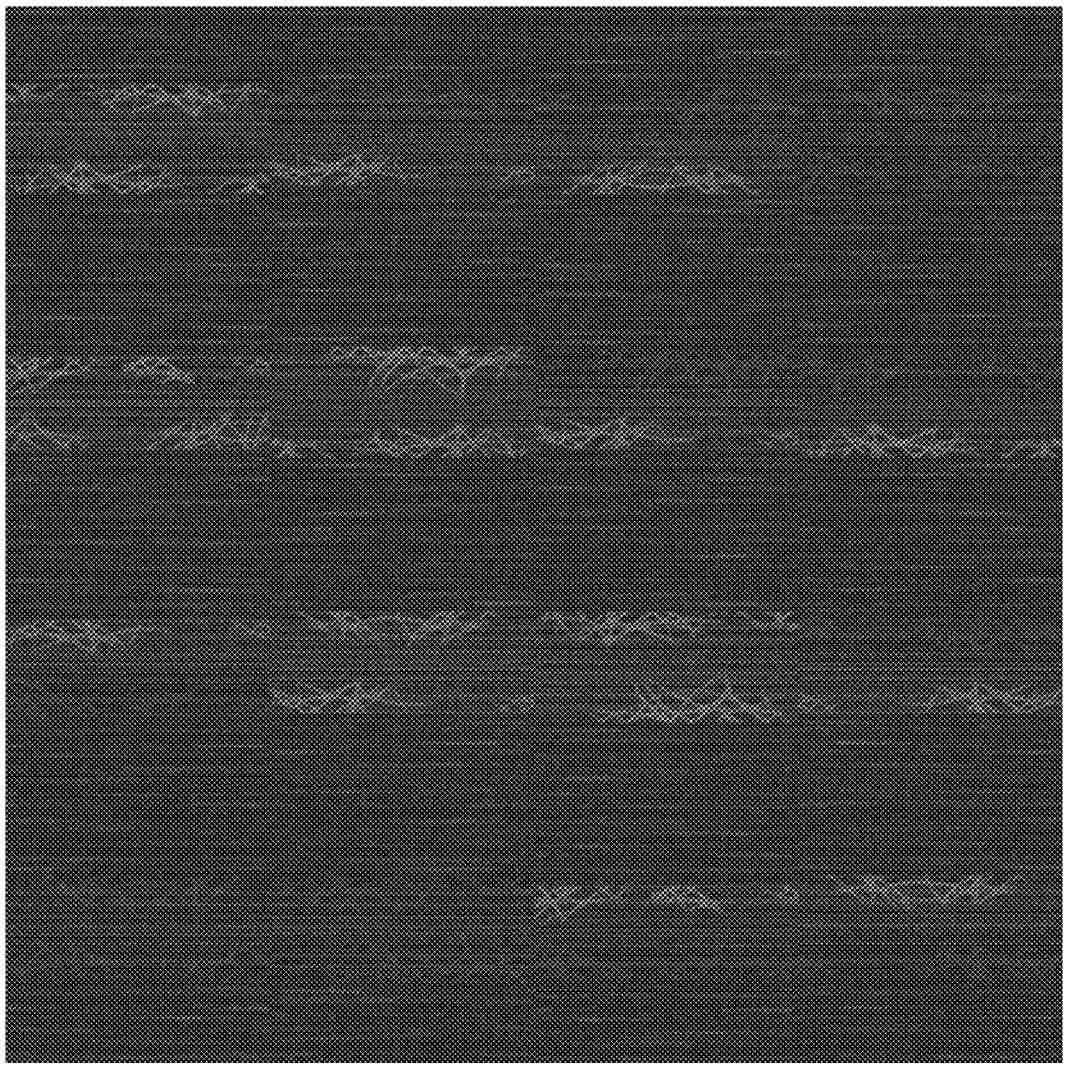
FIGS. 8A-8B respectively display an exemplary floor covering configuration and a corresponding installation key for the displayed floor covering configuration.
Figure 8B:
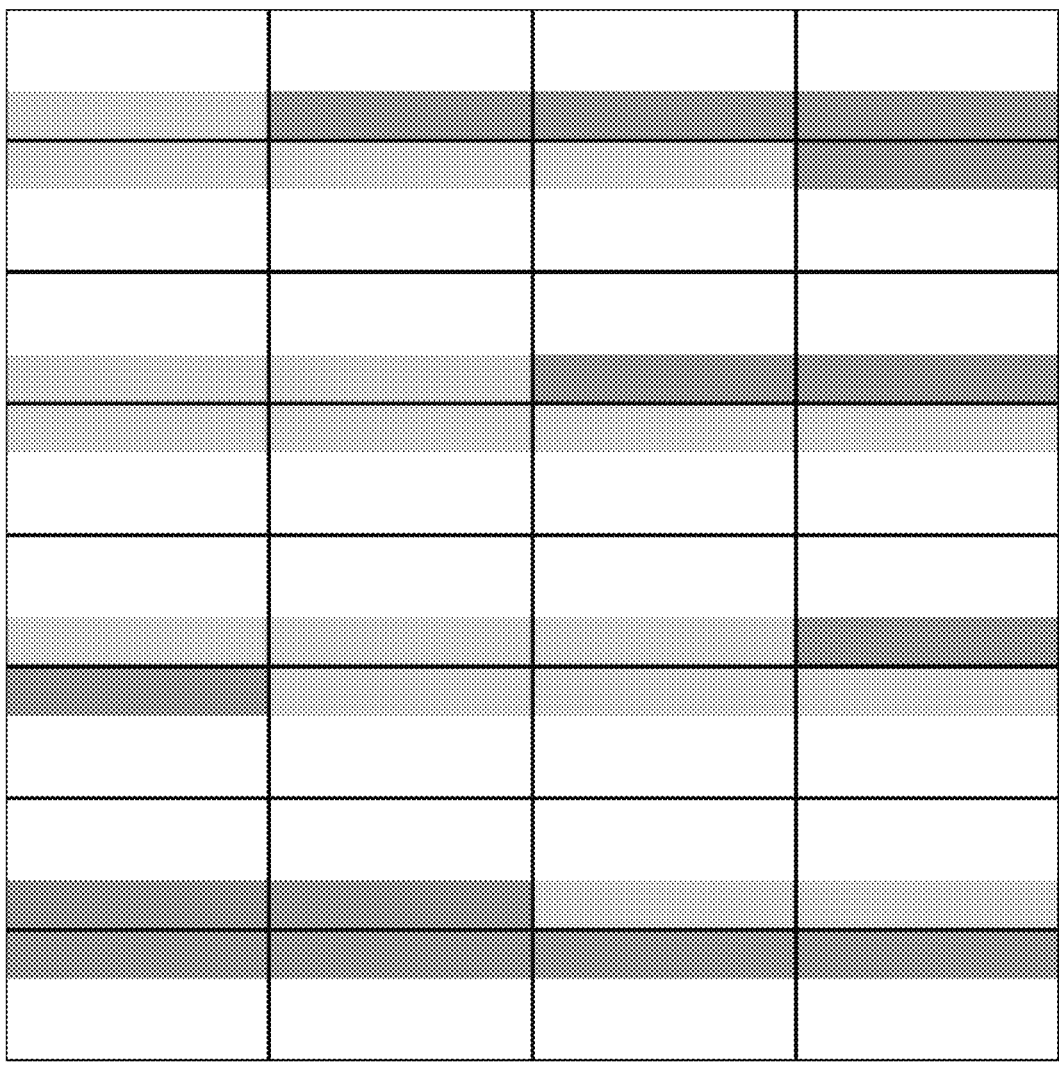
Figure 9A:
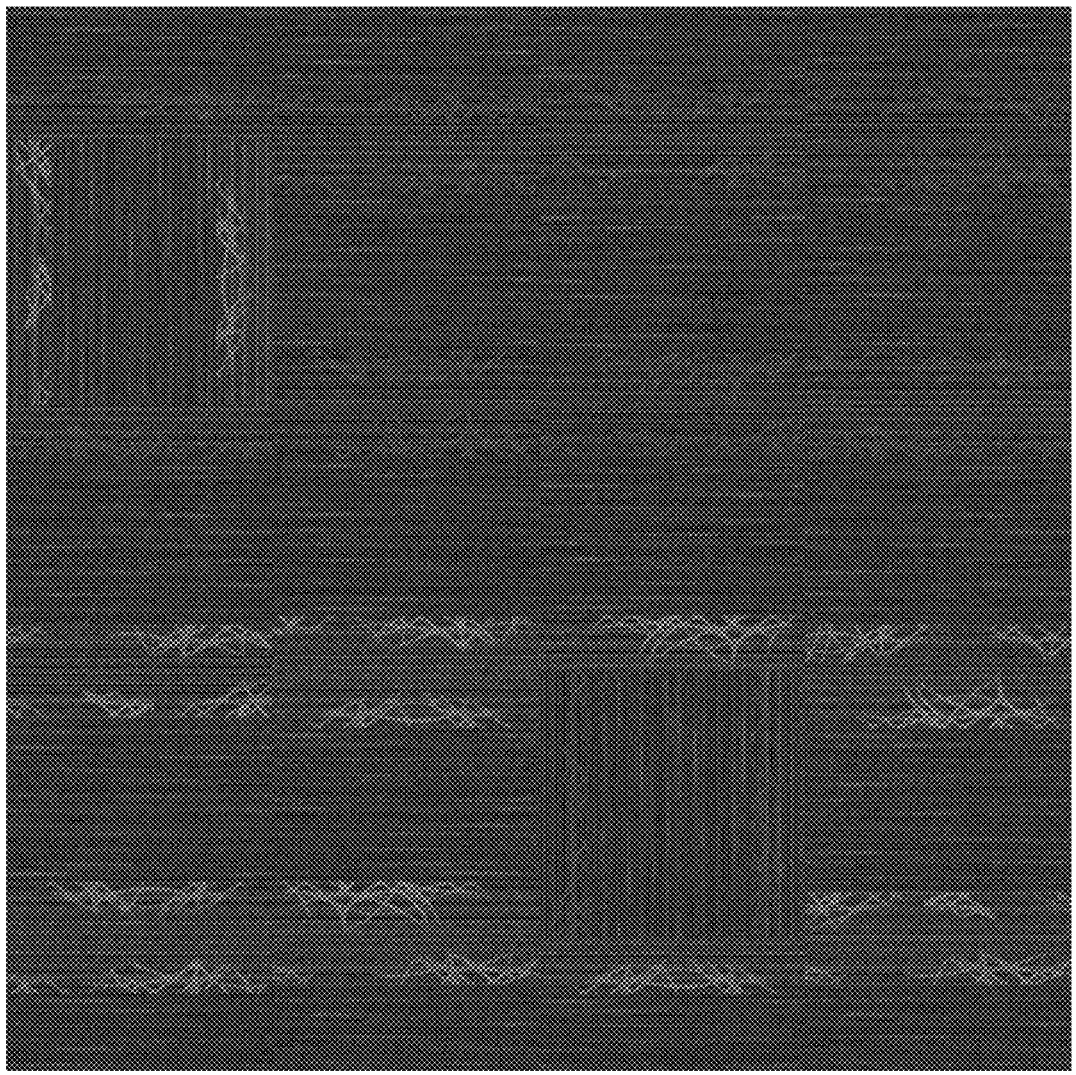
FIGS. 9A-9B respectively display an exemplary floor covering configuration and a corresponding installation key for the displayed floor covering configuration.
Figure 9B:
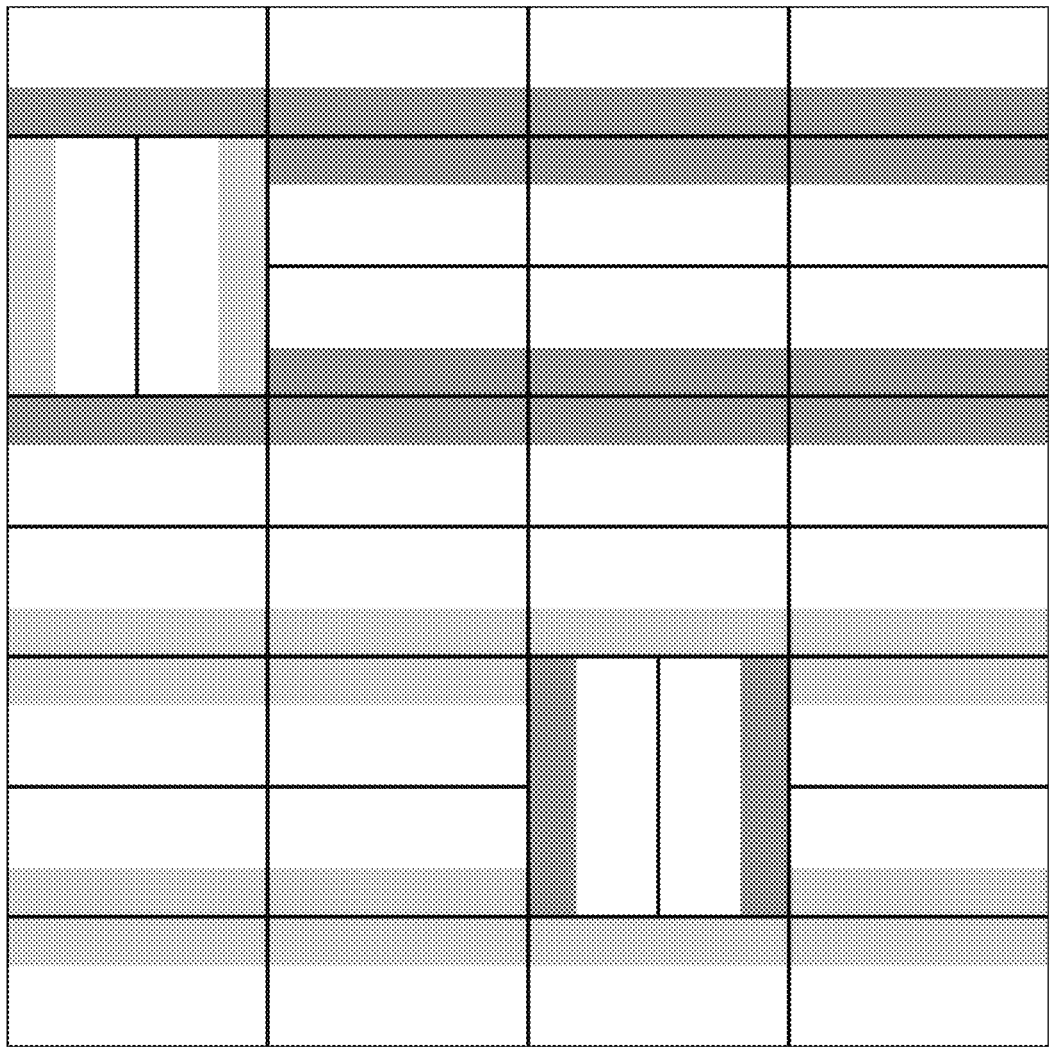
Figure 10A:
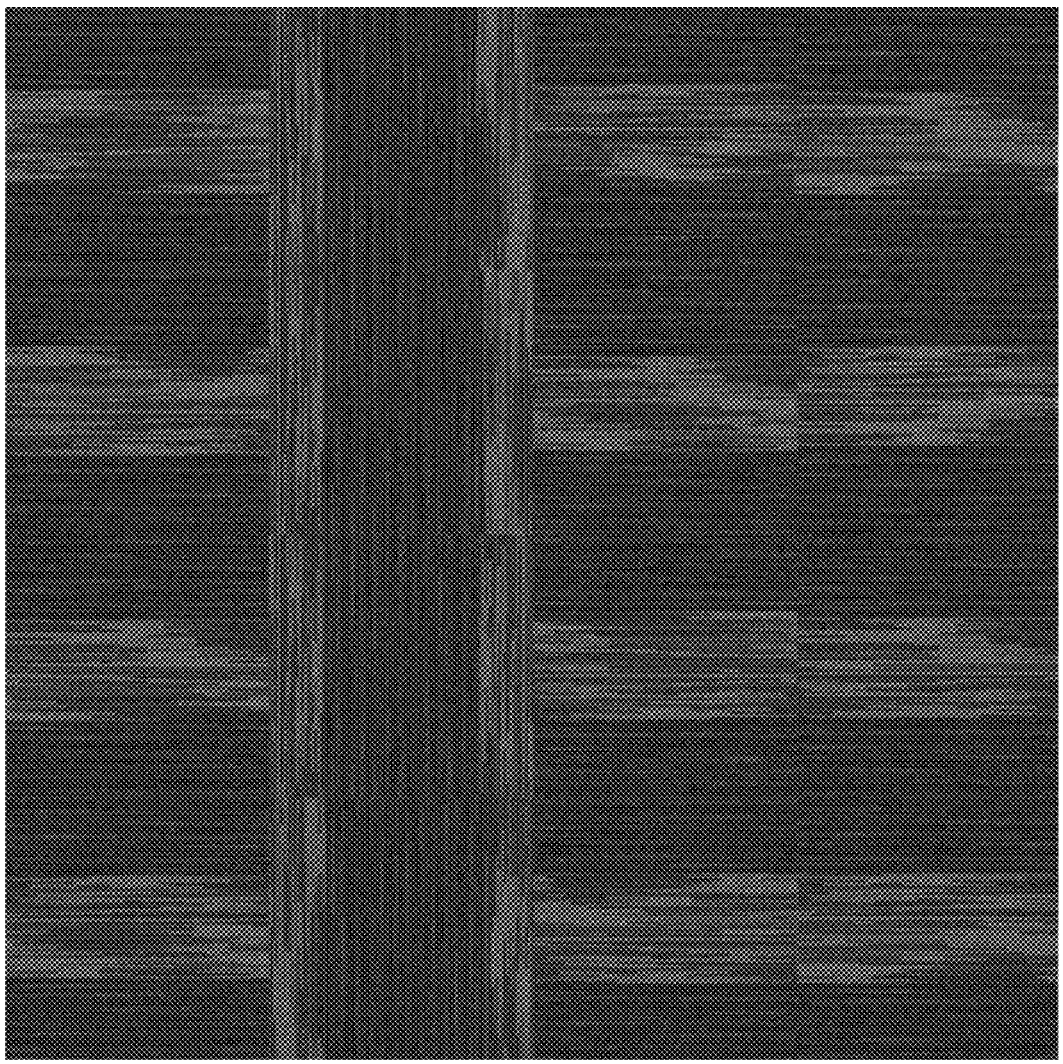
FIGS. 10A-10B respectively display an exemplary floor covering configuration and a corresponding installation key for the displayed floor covering configuration.
Figure 10B:
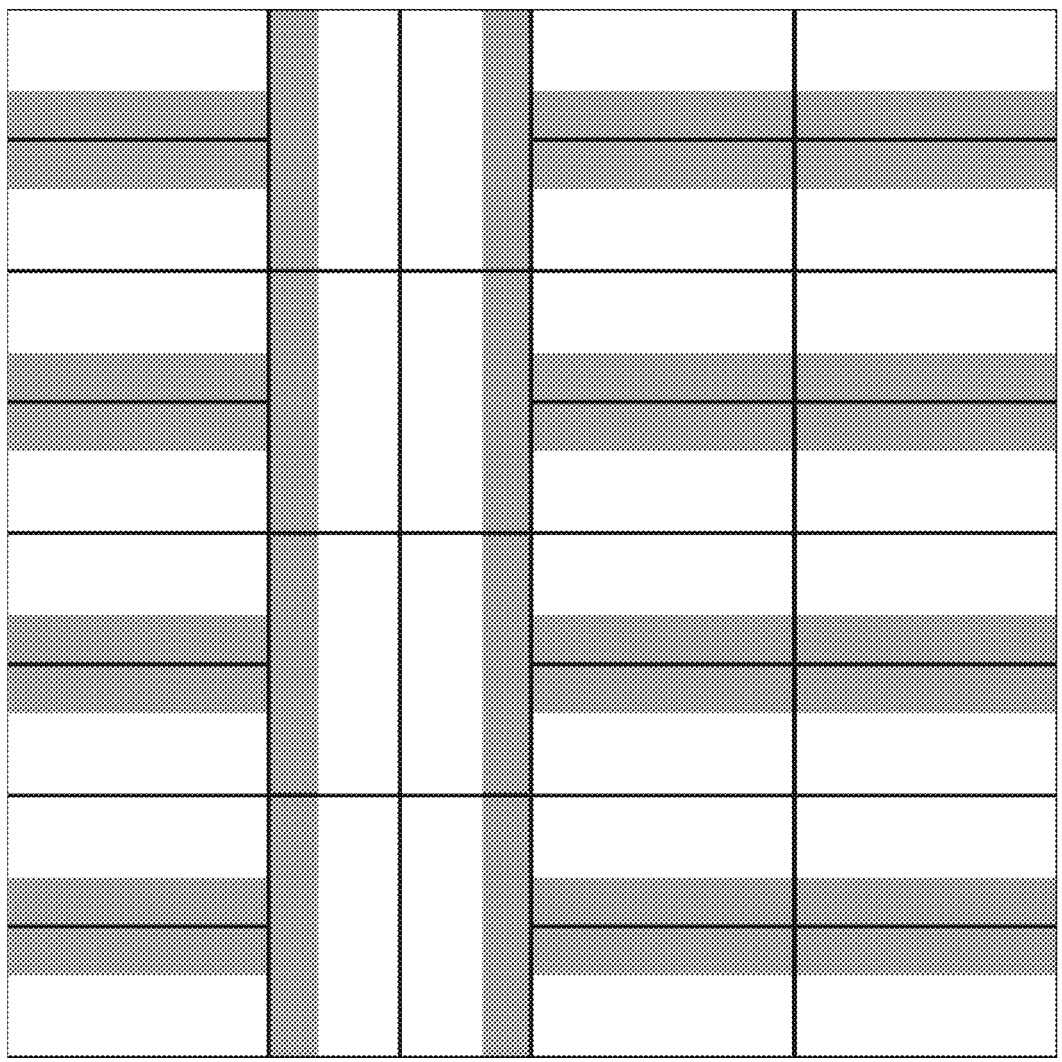
Figure 11A:
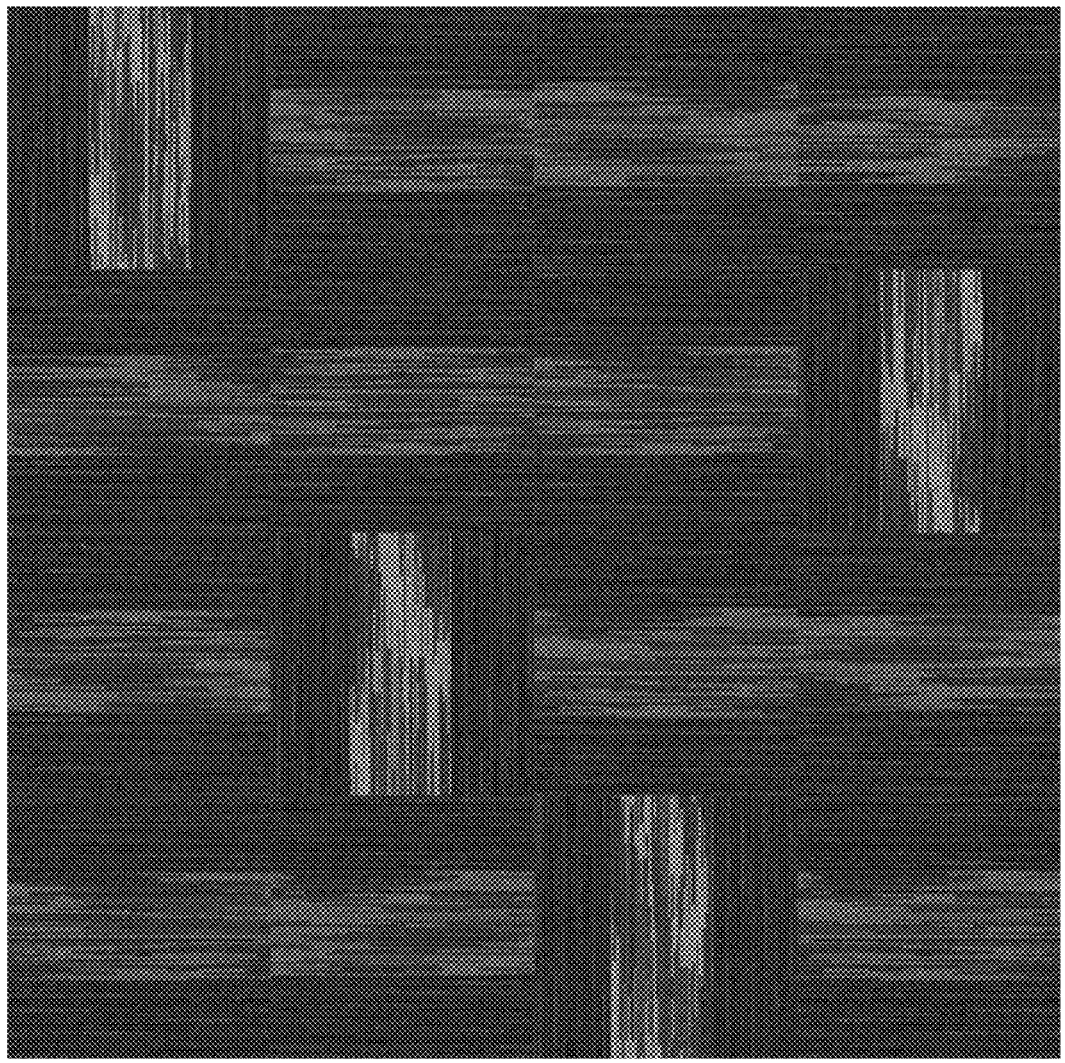
FIGS. 11A-11B respectively display an exemplary floor covering configuration and a corresponding installation key for the displayed floor covering configuration.
Figure 11B:
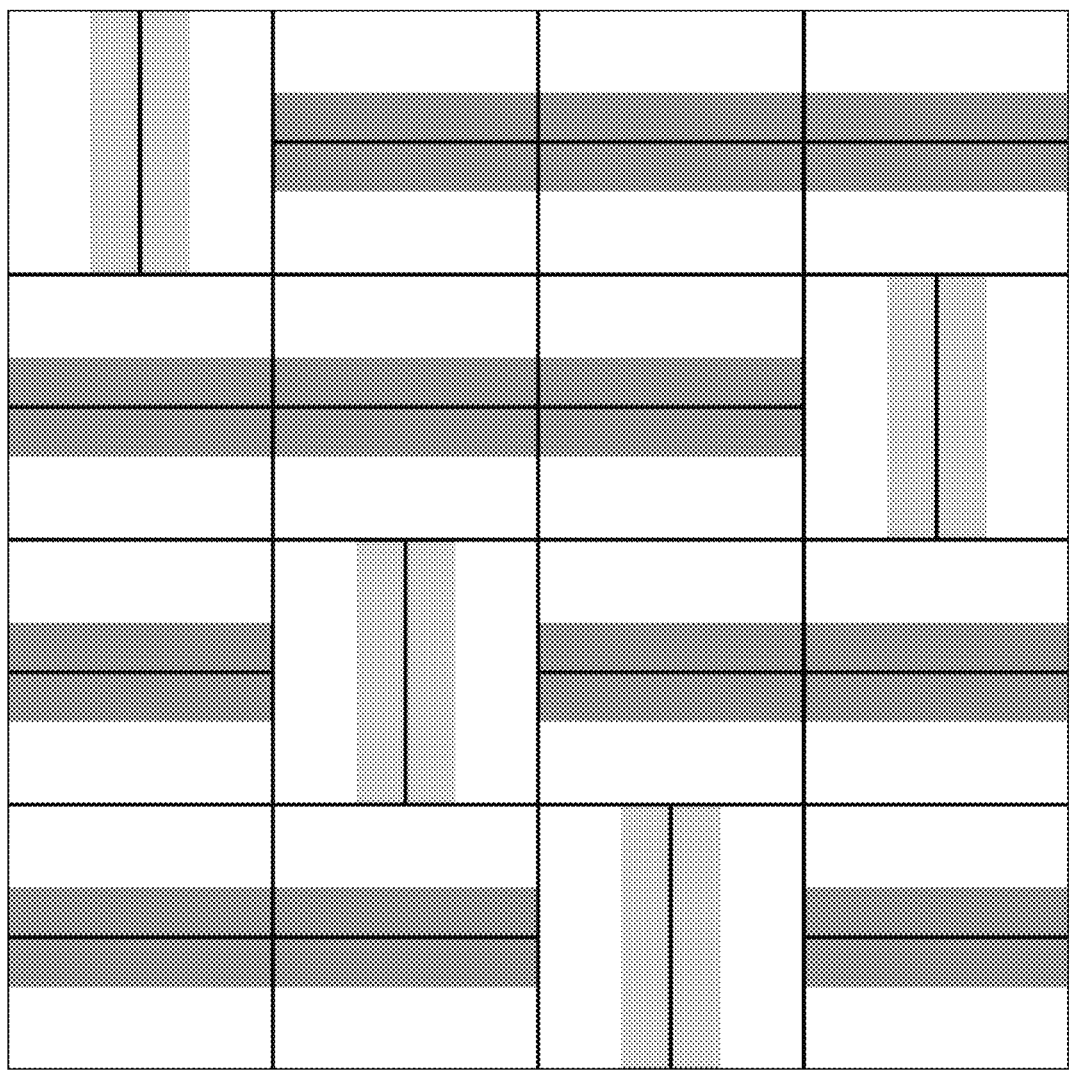
Figure 12A:
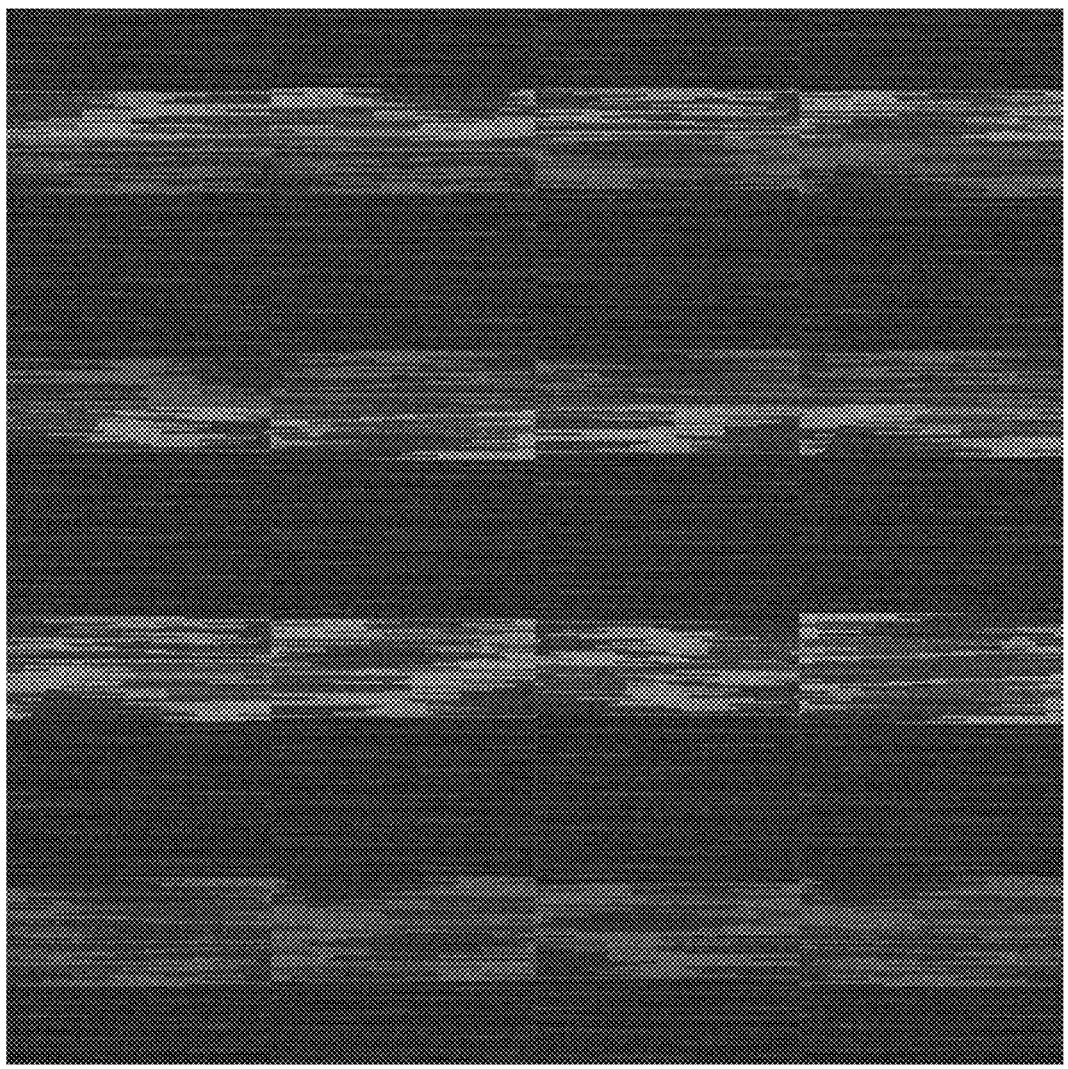
FIGS. 12A-12B respectively display an exemplary floor covering configuration and a corresponding installation key for the displayed floor covering configuration.
Figure 12B:
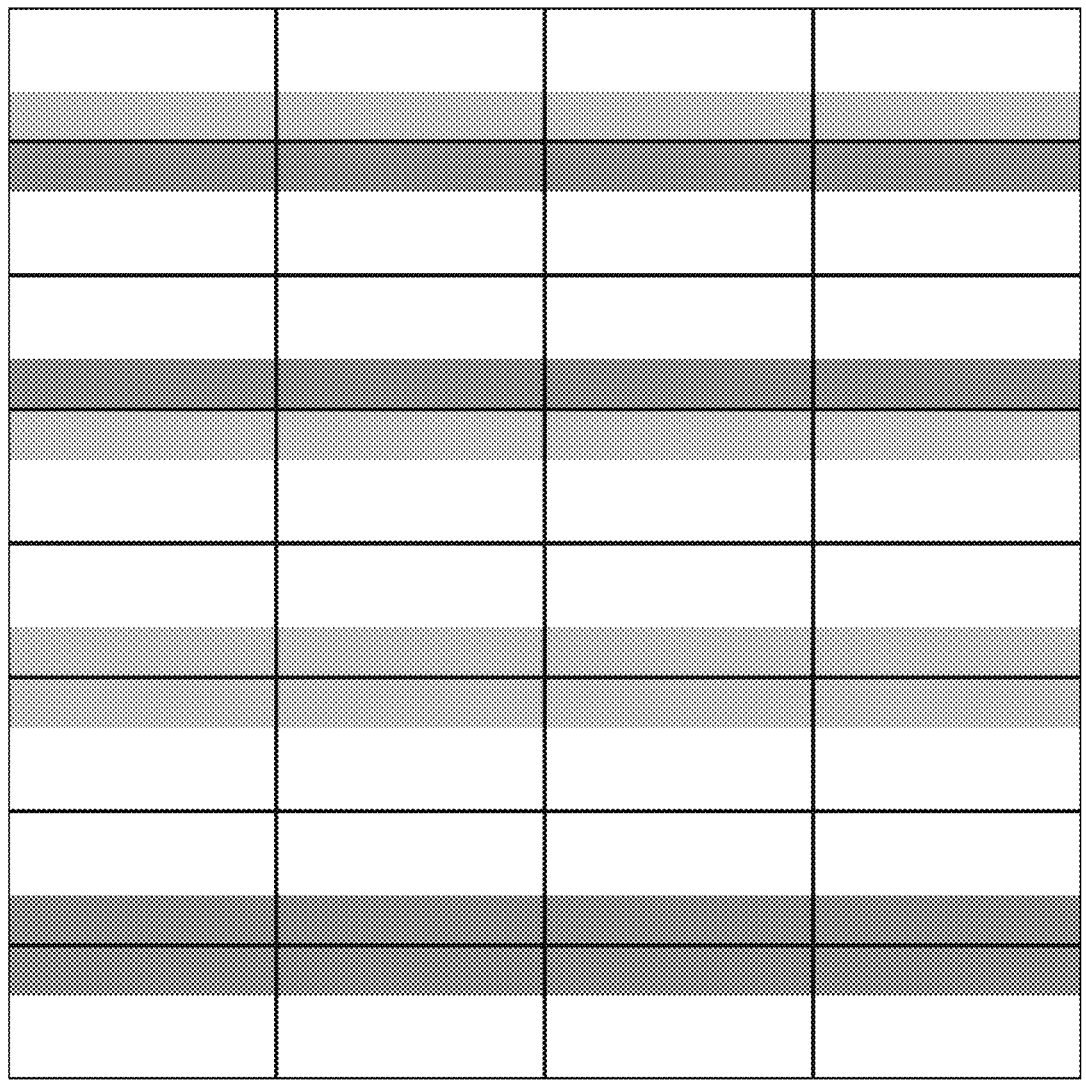
Figure 13A:
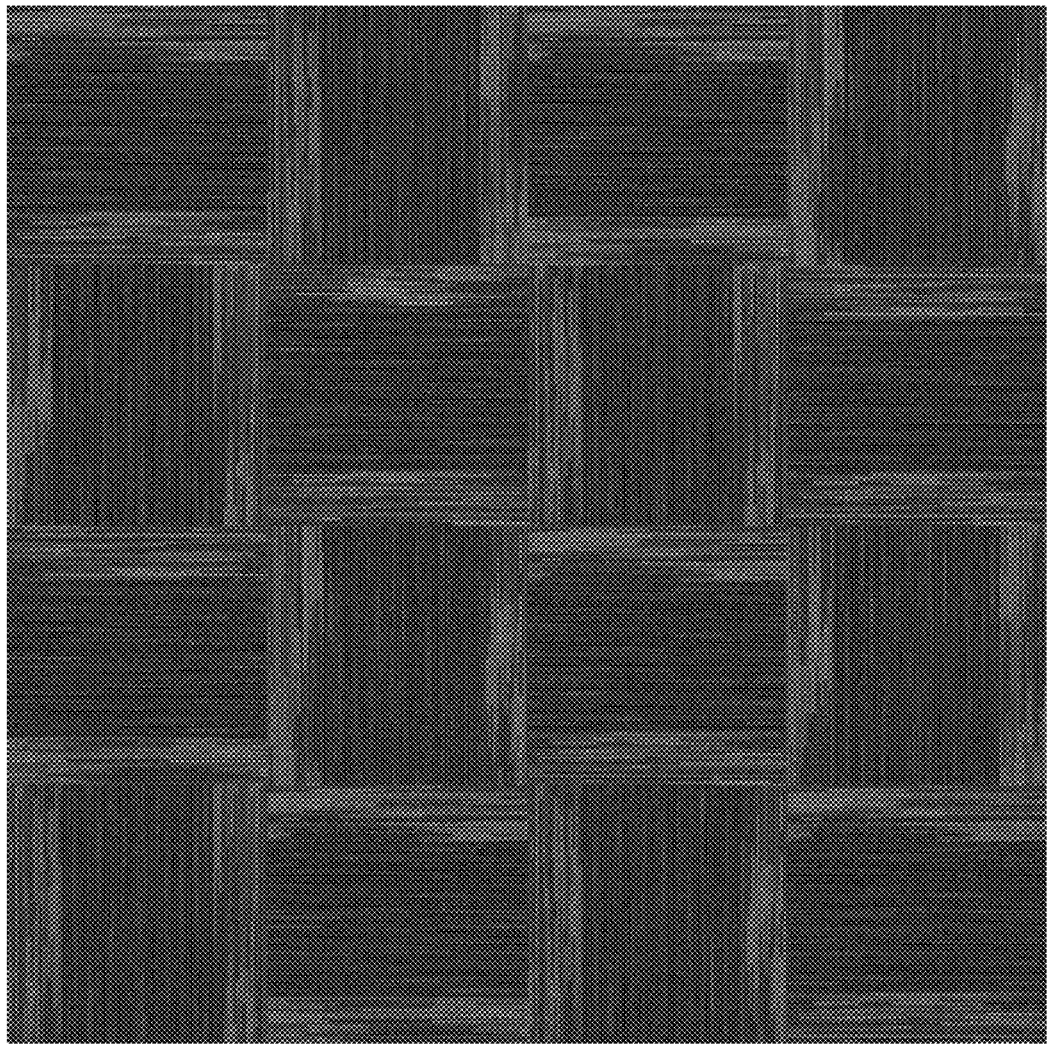
FIGS. 13A-13B respectively display an exemplary floor covering configuration and a corresponding installation key for the displayed floor covering configuration.
Figure 13B:
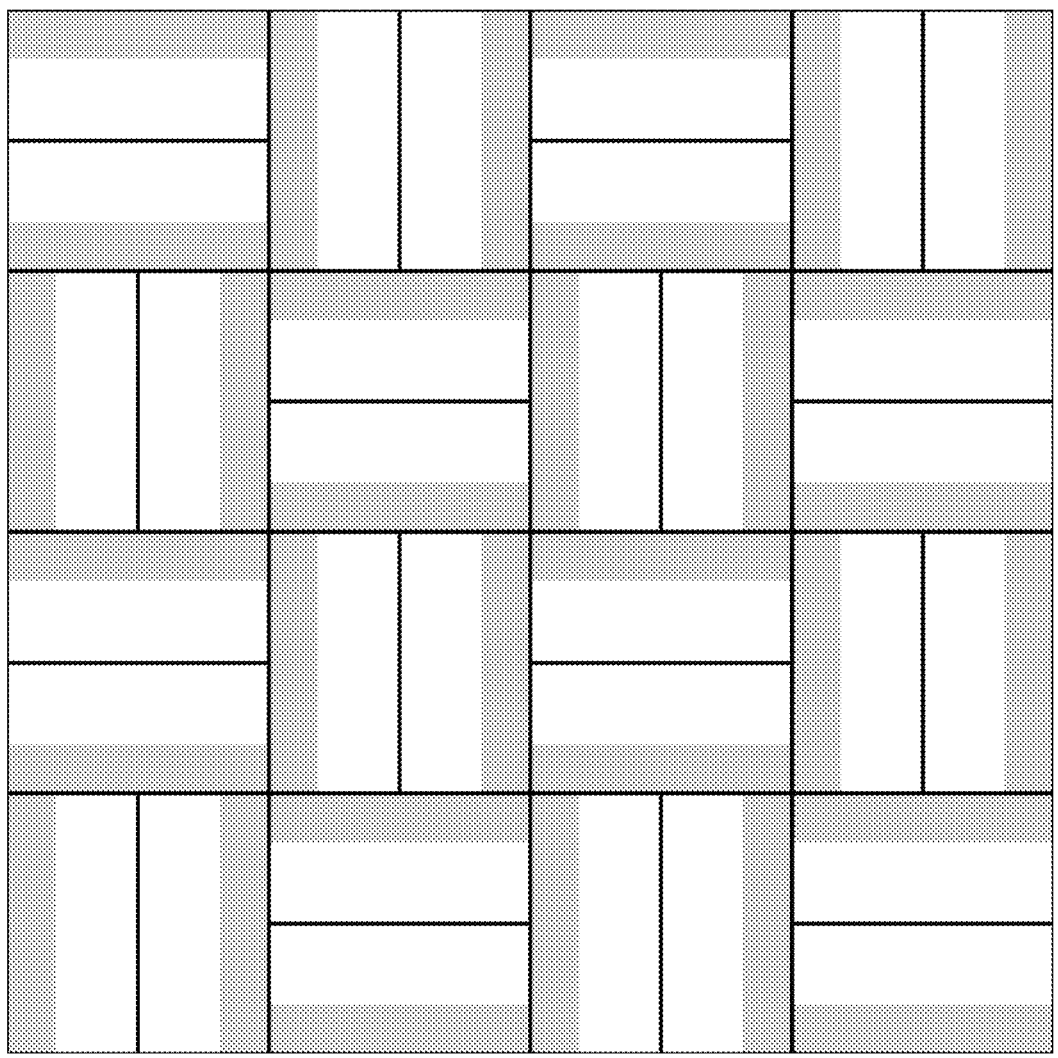

In particular exemplary aspects, such as shown in FIGS. 7A-7B, it is contemplated that the carpet tiles disclosed herein can be incorporated into floor coverings comprising one or more conventional carpet tiles, such as, for example and without limitation, carpet tiles having a uniform face pattern. In these aspects, it is contemplated that the conventional carpet tiles can cooperate with the contrast patterns of adjacent carpet tiles to achieve the desired visual appearance.

Although several embodiments of the invention have been disclosed in the foregoing specification, it is understood by those skilled in the art that many modifications and other embodiments of the invention will come to mind to which the invention pertains, having the benefit of the teaching presented in the foregoing description and associated drawings. It is therefore understood that the invention is not limited to the specific embodiments disclosed herein, and that many modifications and other embodiments of the invention are intended to be included within the scope of the invention. Moreover, although specific terms are employed herein, they are used only in a generic and descriptive sense, and not for the purposes of limiting the described invention.

What is claimed is:

1. A carpet tile system consisting of:
a plurality of substantially similar carpet tiles, each carpet tile having first and second end edges and first and second side edges, the distance between the first and second end edges of each carpet tile corresponding to a length of the carpet tile, the distance between the first and second side edges of each carpet tile corresponding to a width of the carpet tile,
wherein each carpet tile consists essentially of a first portion and a second portion, wherein the first portion of each carpet tile has a width and the second portion of each carpet tile has a width, wherein the second portion extends inwardly from a selected side edge of each carpet tile to an interior edge, wherein the respective widths of the first and second portions of each carpet tile combine to define the width of each carpet tile, and wherein the ratio of the width of each carpet tile to the width of the second portion of each carpet tile ranges from about 2.5:1 to about 20:1;
wherein the first portion consists of a background pattern comprising at least two colors;
wherein the second portion consists of the background pattern and a contrast pattern intermixed with the background pattern, the contrast pattern comprising: at least one contrast color different than the at least two colors of the background pattern, and at least one color of the at least two colors of the background pattern; and
wherein the combined first portion and second portion cooperate to form a carpet tile having a side edge-oriented contrast pattern region; and
wherein the plurality of carpet tiles are positioned relative to one another irrespective of a warp axis and a weft axis of each carpet tile, such that the side edge-oriented contrast pattern region of each carpet tile has a particular orientation relative to the side edge-oriented contrast pattern regions of adjacent carpet tiles, and wherein the plurality of carpet tiles cooperatively define a floor covering.

2. The carpet tile system of claim 1, wherein the side edge-oriented contrast pattern region of a first carpet tile at least partially abuts the side edge-oriented contrast pattern region of an adjacent carpet tile.

3. The carpet tile system of claim 1, wherein the side edge-oriented contrast pattern region of a first carpet tile is spaced apart from the side edge-oriented contrast pattern region of an adjacent carpet tile.

4. The carpet tile system of claim 1, wherein the side edge-oriented contrast pattern region of a first carpet tile at least partially abuts an end edge of an adjacent carpet tile.

5. The carpet tile system of claim 1, wherein the first portion of each carpet tile extends the entire length of the carpet tile between selected portions of the first and second end edges.

6. The carpet tile system of claim 1, wherein each carpet tile is substantially rectangular.

7. The carpet tile system of claim 1, wherein at least a portion of the contrast pattern is spaced from the selected side edge.

8. The carpet tile system of claim 1, wherein the at least two colors of the background pattern comprise a majority color and a minority color.

9. The carpet tile system of claim 8, wherein the contrast pattern comprises the minority color.

10. The carpet tile system of claim 9, wherein the contrast pattern further comprises a plurality of yarn tufts, wherein at least some of the yarn tufts of the at least one contrast color have a height greater than at least some of the yarn tufts of the minority color proximate the yarn tufts of the at least one contrast color.

11. The carpet tile system of claim 1, wherein the contrast pattern is printed on the carpet tile.

12. The carpet tile system of claim 1, wherein each carpet tile has a tufted face.

13. The carpet tile system of claim 1, wherein each carpet tile has a woven face.

14. The carpet tile system of claim 1, wherein each carpet tile has a fusion-bonded face.

15. The carpet tile system of claim 1, wherein the contrast pattern comprises a plurality of substantially parallel stripes.

16. The carpet tile system of claim 15, wherein the warp axis of each carpet tile extends between the first end edge and the second end edge and the weft axis of each carpet tile extends between the first side edge and the second side edge, and wherein each stripe of the plurality of stripes has an elongate length extending parallel to the warp axis and a width extending parallel to the weft axis, wherein the elongate length of each stripe is greater than the width of each respective stripe.

17. The carpet tile system of claim 16, wherein at least one pair of adjacent stripes of the plurality of stripes have a substantially equal length.

18. The carpet tile system of claim 16, wherein at least one pair of adjacent stripes of the plurality of stripes have a substantially equal width.

19. The carpet tile system of claim 16, wherein the respective elongate lengths of the plurality of stripes are randomized among the plurality of stripes.

20. The carpet tile system of claim 16, wherein the respective widths of the plurality of stripes are randomized among the plurality of stripes.

21. The carpet tile system of claim 16, wherein at least two adjacent stripes of the plurality of stripes are spaced apart along the weft axis.

22. The carpet tile system of claim 16, wherein at least two adjacent stripes of the plurality of stripes are staggered along the warp axis.

23. The carpet tile system of claim 16, wherein the warp axis of each carpet tile extends between the first end edge and the second end edge and the weft axis of each carpet tile extends between the first side edge and the second side edge, and wherein each stripe of the plurality of stripes has an elongate length extending parallel to the weft axis and a width extending parallel to the warp axis, wherein the elongate length of each stripe is greater than the width of each respective stripe.

24. The carpet tile system of claim 23, wherein at least one pair of adjacent stripes of the plurality of stripes have a substantially equal length.

25. The carpet tile system of claim 23, wherein at least one pair of adjacent stripes of the plurality of stripes have a substantially equal width.

26. The carpet tile system of claim 23, wherein the respective elongate lengths of the plurality of stripes are randomized among the plurality of stripes.

27. The carpet tile system of claim 23, wherein the respective widths of the plurality of stripes are randomized among the plurality of stripes.

28. The carpet tile system of claim 23, wherein at least two adjacent stripes of the plurality of stripes are spaced apart along the weft axis.

29. The carpet tile system of claim 23, wherein at least two adjacent stripes of the plurality of stripes are staggered along the warp axis.

30. The carpet tile system of claim 1, wherein the contrast pattern comprises an abstract pattern.

31. A method for forming a floor covering, the method consisting of:

selectively positioning a plurality of substantially similar carpet tiles relative to one another on a flooring surface irrespective of a respective warp axis and a weft axis of each carpet tile, each carpet tile having first and second end edges and first and second side edges, the distance between the first and second end edges of each carpet tile corresponding to a length of the carpet tile, the distance between the first and second side edges of each carpet tile corresponding to a width of the carpet tile;

wherein each carpet tile consists essentially of a first portion and a second portion, wherein the first portion of each carpet tile has a width and the second portion of each carpet tile has a width, wherein the second portion extends inwardly from a selected side edge of the carpet tile to an interior edge, wherein the respective widths of the first and second portions of each carpet tile combine to define the width of each carpet tile, and wherein the ratio of the width of each carpet tile to the width of the second portion of each carpet tile ranges from about 2.5:1 to about 20:1;

wherein the first portion consists of a background pattern comprising at least two colors;

wherein the second portion consists of the background pattern and a contrast pattern intermixed with the background pattern, the contrast pattern comprising: at least one contrast color different than the at least two colors of the background pattern, and at least one color of the at least two colors of the background pattern; and wherein the combined first portion and second portion cooperate to form a carpet tile having a side edge-oriented contrast pattern region, and wherein the side edge-oriented contrast pattern region of each carpet tile has a particular orientation relative to the side edge-oriented contrast pattern regions of adjacent carpet tiles, and wherein the plurality of carpet tiles cooperatively define a floor covering.

32. The method of claim 31, wherein a first carpet tile of the plurality of carpet tiles is positioned so that the side edge-oriented contrast pattern region of the first carpet tile at least partially abuts the side edge-oriented contrast pattern region of an adjacent carpet tile.

33. The method of claim 31, wherein a first carpet tile of the plurality of carpet tiles is positioned so that-the side edge-oriented contrast pattern region of the first carpet tile is spaced apart from the side edge-oriented contrast pattern region of an adjacent carpet tile.

34. The method of claim 31, wherein a first carpet tile of the plurality of carpet tiles is positioned so that the side edge-oriented contrast pattern region of the first carpet tile at least partially abuts an end edge of an adjacent carpet tile.

* * * * *